United States Patent
Ma et al.

(10) Patent No.: US 12,172,549 B2
(45) Date of Patent: Dec. 24, 2024

(54) VEHICLE AND BRAKING METHOD AND DEVICE THEREFOR

(71) Applicant: BYD COMPANY LIMITED, Guangdong (CN)

(72) Inventors: Dong Ma, Shenzhen (CN); Lu Wang, Shenzhen (CN); Daolin Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 329 days.

(21) Appl. No.: 17/639,251

(22) PCT Filed: Aug. 27, 2020

(86) PCT No.: PCT/CN2020/111837
§ 371 (c)(1),
(2) Date: Feb. 28, 2022

(87) PCT Pub. No.: WO2021/037163
PCT Pub. Date: Mar. 4, 2021

(65) Prior Publication Data
US 2022/0340013 A1    Oct. 27, 2022

(30) Foreign Application Priority Data
Aug. 30, 2019 (CN) .......................... 201910819039.9

(51) Int. Cl.
*B60L 7/26* (2006.01)
*B60T 8/32* (2006.01)
(Continued)

(52) U.S. Cl.
CPC .............. *B60L 7/26* (2013.01); *B60T 8/3215* (2013.01); *B60T 8/72* (2013.01); *B60T 13/586* (2013.01);
(Continued)

(58) Field of Classification Search
CPC ............ B60L 7/26; B60T 8/3215; B60T 8/72; B60T 13/586; B60T 2210/12;
(Continued)

(56) References Cited

U.S. PATENT DOCUMENTS 7,363,116 B2    4/2008  Fletchtner et al.
2018/0154875 A1*  6/2018  Akihiro ................... B60L 50/16

FOREIGN PATENT DOCUMENTS

CN    101032960 A    9/2007
CN    101472777 A    7/2009
(Continued)

OTHER PUBLICATIONS

International Search Report from PCT /CN2020/111835 dated Nov. 18, 2020 (2 pages).
(Continued)

*Primary Examiner* — Anne Marie Antonucci
*Assistant Examiner* — Kirsten Jade M Santos
(74) *Attorney, Agent, or Firm* — Calfee, Halter & Griswold LLP

(57) ABSTRACT

A braking method includes: obtaining a first state information of the vehicle, which includes a vehicle mass and a deceleration required by braking; calculating a braking torque according to the first state information, and controlling the vehicle to output an electric braking torque according to the braking torque; obtaining a current vehicle speed and a mechanical braking application delay time; calculating an electric braking exit speed according to the braking torque required by the vehicle and the deceleration required by braking; calculating a mechanical braking application speed according to the mechanical braking application delay time, the deceleration required by braking, and the electric braking exit speed; and determining whether to control the vehicle to unload the electric braking torque, and whether to control the vehicle to apply a mechanical braking torque according to the current vehicle speed, the electric braking exit speed, and the mechanical braking application speed.

20 Claims, 10 Drawing Sheets

(51) Int. Cl.
B60T 8/72 (2006.01)
B60T 13/58 (2006.01)

(52) U.S. Cl.
CPC ....... *B60T 2210/12* (2013.01); *B60T 2210/20* (2013.01); *B60T 2250/00* (2013.01); *B60T 2250/02* (2013.01); *B60T 2250/04* (2013.01); *B60T 2270/604* (2013.01)

(58) Field of Classification Search
CPC ............ B60T 2210/20; B60T 2250/00; B60T 2250/02; B60T 2250/04; B60T 2270/604; B60T 1/062; B60T 8/1705; B60T 8/1893; B60T 8/3235; B60T 13/665; B60T 17/228; B60T 13/662; B60T 8/17; F16D 2121/24; B61H 13/00
See application file for complete search history.

(56) References Cited

FOREIGN PATENT DOCUMENTS

| | | | | |
|---|---|---|---|---|
| CN | 102050116 | A | 5/2011 | |
| CN | 102431530 | A | 5/2012 | |
| CN | 102712259 | A | 10/2012 | |
| CN | 103359133 | A | 10/2013 | |
| CN | 106828463 | A | 6/2017 | |
| CN | 107351824 | A | 11/2017 | |
| CN | 107792039 | A | 3/2018 | |
| CN | 108859781 | A | 11/2018 | |
| CN | 109572654 | A | 4/2019 | |
| CN | 109664869 | A | 4/2019 | |
| CN | 109747665 | A | 5/2019 | |
| CN | 110015280 | A * | 7/2019 | ............... B60L 7/18 |
| CN | 110027590 | A | 7/2019 | |
| CN | 110040001 | A * | 7/2019 | ............... B60L 7/26 |
| EP | 3056397 | A | 8/2016 | |
| EP | 3412527 | A1 | 12/2018 | |
| JP | 1159400 | A | 3/1999 | |
| JP | 2008278751 | A | 11/2008 | |
| JP | 4454259 | B2 | 4/2010 | |

OTHER PUBLICATIONS

International Search Report from PCT /CN2020/111836 dated Nov. 25, 2020 (3 pages).
International Search Report from PCT /CN2020/111839 dated Nov. 25, 2020 (3 pages).
International Search Report from PCT /CN2020/111837 dated Nov. 26, 2020 (2 pages).

* cited by examiner

VEHICLE AND BRAKING METHOD AND DEVICE THEREFOR

CROSS-REFERENCE TO RELATED APPLICATIONS

The disclosure is the national stage of the PCT International Application No. PCT/CN2020/111837, filed on Aug. 27, 2020, which claims priority to Chinese Patent Application No. 201910819039.9, entitled "VEHICLE AND BRAKING METHOD AND DEVICE THEREFOR" and filed on Aug. 30, 2019, which is are incorporated herein by reference in their entireties.

FIELD

The disclosure relates to the field of vehicle technologies, and more specifically, to a vehicle and a braking method and device therefor.

BACKGROUND

With the development of science and technology, vehicles have gradually become a part of people's life, and the people have increasingly high requirements for safety of the vehicles. To ensure the safety of a vehicle during driving, it is required that the vehicle can provide a required braking torque in a timely and accurate manner. Therefore, it is of great significance to study how to perform effective braking control over the vehicle.

SUMMARY

The disclosure aims to at least solve one of the technical problems in related arts to some extent.

In view of this, the disclosure provides a vehicle and a braking method and device therefor, to improve the precision of vehicle braking control, and synchronously perform electric braking exit and mechanical braking application.

To achieve the above objectives, an embodiment of a first aspect of the disclosure provides a braking method for a vehicle, including the following steps: obtaining a first state information of the vehicle, where the first state information includes a vehicle mass and a deceleration required by braking; calculating a braking torque required by the vehicle according to the first state information, and controlling the vehicle to output an electric braking torque according to the braking torque required by the vehicle; obtaining a current vehicle speed of the vehicle and a mechanical braking application delay time; calculating an electric braking exit speed according to the braking torque required by the vehicle and the deceleration required by braking; calculating a mechanical braking application speed according to the mechanical braking application delay time, the deceleration required by braking, and the electric braking exit speed; and determining whether to control the vehicle to unload the electric braking torque, and whether to control the vehicle to apply a mechanical braking torque according to the current vehicle speed, the electric braking exit speed, and the mechanical braking application speed.

According to the braking method for a vehicle in this embodiment of the disclosure, first, the first state information of a vehicle is obtained, a braking torque required by the vehicle is calculated according to the first state information, and the vehicle is controlled to output an electric braking torque according to the braking torque required by the vehicle; then, a current vehicle speed of the vehicle and a mechanical braking application delay time are obtained, an electric braking exit speed is calculated according to the braking torque required by the vehicle and the deceleration required by braking, and a mechanical braking application speed is calculated according to the mechanical braking application delay time, the deceleration required by braking, and the electric braking exit speed; and further, it is determined whether to control the vehicle to unload the electric braking torque, and whether to control the vehicle to apply a mechanical braking torque according to the current vehicle speed, the electric braking exit speed, and the mechanical braking application speed. This braking method for a vehicle can improve the precision of vehicle braking control, and synchronously perform electric braking exit and mechanical braking application.

To achieve the above objectives, an embodiment of a second aspect of the disclosure provides a braking device for a vehicle, including: a first obtaining module, configured to obtain a first state information of the vehicle, where the first state information includes a vehicle mass and a deceleration required by braking; a first calculation module, configured to calculate a braking torque required by the vehicle according to the first state information; a control module, configured to control the vehicle to output an electric braking torque according to the braking torque required by the vehicle; a second obtaining module, configured to obtain a current vehicle speed of the vehicle and a mechanical braking application delay time; and a second calculation module, configured to calculate an electric braking exit speed according to the braking torque required by the vehicle and the deceleration required by braking; and calculate a mechanical braking application speed according to the mechanical braking application delay time, the deceleration required by braking, and the electric braking exit speed, where the control module is further configured to determine whether to control the vehicle to unload the electric braking torque, and whether to control the vehicle to apply a mechanical braking torque according to the current vehicle speed, the electric braking exit speed, and the mechanical braking application speed.

According to the braking device for a vehicle in this embodiment of the disclosure, first, first state information of a vehicle is obtained, a braking torque required by the vehicle is calculated according to the first state information, and the vehicle is controlled to output an electric braking torque according to the braking torque required by the vehicle; then, a current vehicle speed of the vehicle and a delay time of applying mechanical braking are obtained, an electric braking exit speed is calculated according to the braking torque required by the vehicle and the deceleration required by braking, and a mechanical braking application speed is calculated according to the delay time of applying mechanical braking, the deceleration required by braking, and the electric braking exit speed; and further, it is determined whether to control the vehicle to unload the electric braking torque, and whether to control the vehicle to apply a mechanical braking torque according to the current vehicle speed, the electric braking exit speed, and the mechanical braking application speed. This braking device can improve the precision of vehicle braking control, and realize the synchronization of electric braking exiting and mechanical braking application.

To achieve the above objectives, an embodiment of a third aspect of the disclosure provides a vehicle, including the braking device for a vehicle in the above embodiments.

Through the above braking device for a vehicle, the vehicle in the embodiments of the disclosure can improve the precision of vehicle braking control, and synchronously perform electric braking exit and mechanical braking application.

The additional aspects and advantages of the disclosure will be provided in the following description, some of which will become apparent from the following description or may be learned from practices of the disclosure.

BRIEF DESCRIPTION OF THE DRAWINGS

The foregoing and/or additional aspects and advantages of the disclosure will become apparent and comprehensible in the description of the embodiments made with reference to the following accompanying drawings, where.

DETAILED DESCRIPTION

The embodiments of the disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the disclosure and cannot be construed as a limitation to the disclosure.

The following describes a vehicle and a braking method and device therefor in the embodiments of the disclosure with reference to the accompanying drawings.

Figure 1:
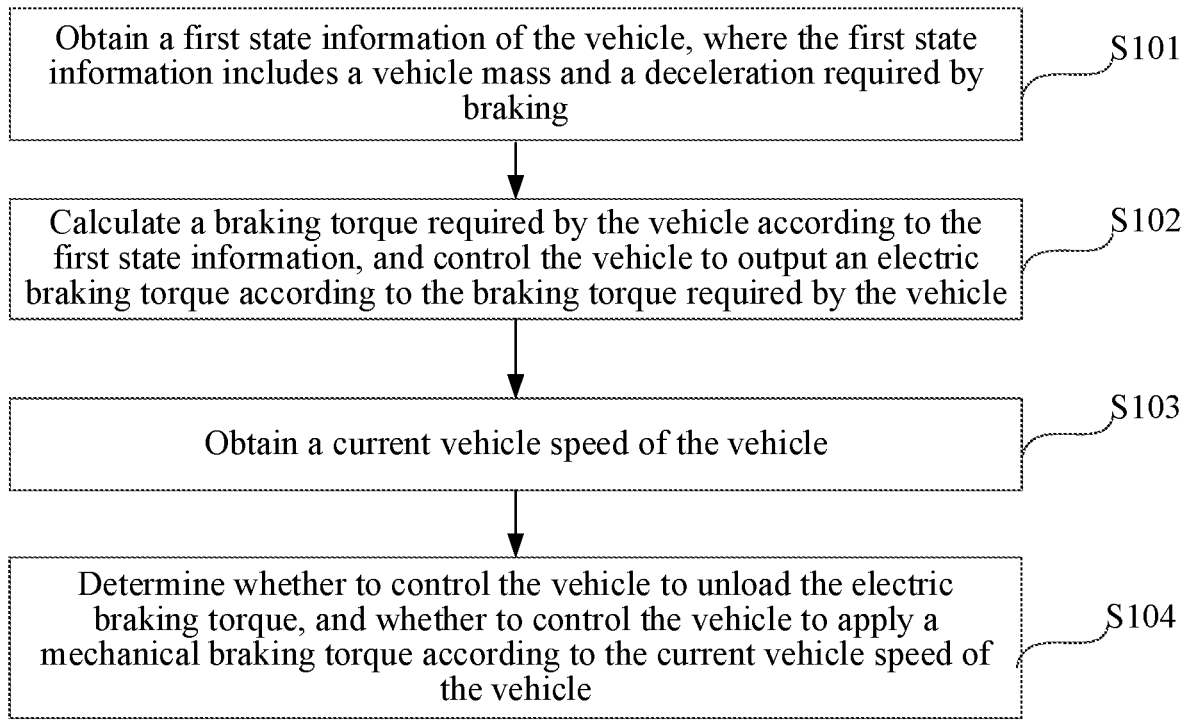
FIG. 1 is a flowchart of a braking method for a vehicle according to an embodiment of the disclosure.

FIG. 1 is a flowchart of a braking method for a vehicle according to an embodiment of the disclosure. As shown in FIG. 1, the braking method for a vehicle includes the following steps:

S101. Obtain a first state information of the vehicle, where the first state information includes a vehicle mass and a deceleration required by braking.

In some embodiments, the vehicle may be a rail vehicle, for example, an urban rail train, a subway train, or the like. In an entire vehicle braking process, an electric braking part is executed by a transmission control unit (TCU), and a mechanical braking part is executed by a brake control unit (BCU). When the vehicle starts to brake, both of the two units receive the first state information of the vehicle sent by a central control unit (CCU), where the first state information includes the vehicle mass and the deceleration required by braking.

S102. Calculate a braking torque required by the vehicle according to the first state information, and control the vehicle to output an electric braking torque according to the braking torque required by the vehicle.

In some embodiments, the TCU calculates the braking torque required by the vehicle in a braking process according to the received first state information of the vehicle, and controls a drive motor of the vehicle to preferentially apply electric braking according to the braking torque required by the vehicle, that is, controls the drive motor to output the electric braking torque. Meanwhile, the TCU feeds back an electric braking state so that the BCU can monitor the electric braking state in real time. In this process, the electric braking is applied only by the drive motor, and no mechanical braking is involved. In some embodiments, the drive motor is a permanent magnet synchronous motor.

S103. Obtain a current vehicle speed of the vehicle.

S104. Determine whether to control the vehicle to unload the electric braking torque, and whether to control the vehicle to apply a mechanical braking torque according to the current vehicle speed of the vehicle.

In some embodiments, after a braking request is generated, the TCU controls the motor of the vehicle to output the electric braking torque to reduce the vehicle speed, thereby applying the electric braking to the vehicle. Moreover, in the vehicle braking process, the TCU and the BCU acquire the current vehicle speed of the vehicle in real time, and the TCU compares the acquired vehicle speed with a calculated electric braking exit speed, to determine whether to exit the electric braking, that is, start to unload the electric braking torque; and the BCU compares the acquired vehicle speed with a calculated mechanical braking application speed, to determine whether to start to apply the mechanical braking torque. When determining that the vehicle speed is reduced to the electric braking exit speed, the TCU starts to unload the electric braking torque to exit the electric braking, and when determining that the vehicle speed is reduced to the mechanical braking application speed, the BCU controls the vehicle to apply the mechanical braking torque. In this way, the unloading of the electric braking torque and the application of the mechanical braking torque can be precisely controlled, thereby helping improve riding comfort during vehicle braking.

In some embodiments, during vehicle braking, vehicle braking may be implemented by maximizing the use of electric braking, and the mechanical braking application in the entire braking process may be reduced, thereby effectively avoiding the wear of mechanical device and mechanical shock; and when the output of the electric braking torque cannot satisfy a braking requirement of the vehicle, the mechanical braking torque is applied in time, so that the vehicle is more stable in the braking process, riding comfort for users is improved, and risks such as the vehicle slipping backward at a zero speed can be avoided.

Figure 2:
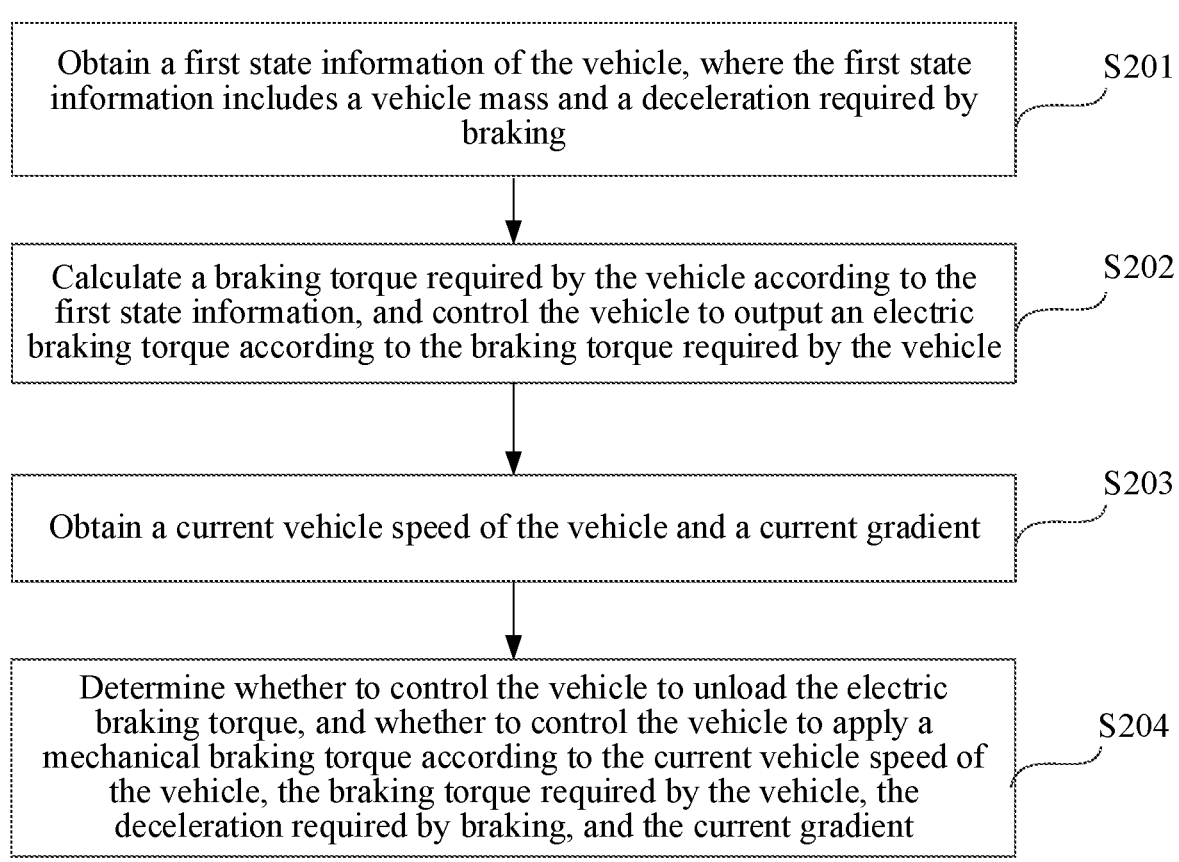
FIG. 2 is a flowchart of a braking method for a vehicle according to a first specific embodiment of the disclosure.

FIG. 2 is a flowchart of a braking method for a vehicle according to a specific embodiment of the disclosure. As shown in FIG. 2, the braking method for a vehicle includes the following steps:

S201. Obtain first state information of a vehicle, where the first state information includes a vehicle mass and a deceleration required by braking.

S202. Calculate a braking torque required by the vehicle according to the first state information, and control the vehicle to output an electric braking torque according to the braking torque required by the vehicle.

S203. Obtain a current vehicle speed of the vehicle and a current gradient.

In some embodiments, a TCU may obtain the current vehicle speed of the vehicle through a vehicle-mounted speed sensor, and obtain the current gradient of the vehicle through a vehicle navigation device or a transponder device on a driving route.

S204. Determine whether to control the vehicle to unload the electric braking torque, and whether to control the vehicle to apply a mechanical braking torque according to the current vehicle speed of the vehicle, the braking torque required by the vehicle, the deceleration required by braking, and the current gradient.

In some embodiments, when the current gradient of the vehicle is zero, only electric braking is involved in a braking process, and when the electric braking torque is completely unloaded and the vehicle speed is zero, the mechanical braking torque starts to be applied so as to park; and when the current gradient of the vehicle is not zero, the mechanical braking torque can be applied while the electric braking torque starts to be unloaded, and when the electric braking torque is completely unloaded and the vehicle speed is zero, the mechanical braking torque is completely applied so as to park. In this way, the precision of vehicle braking control is improved.

In an example, after obtaining the first state information from a CCU, the TCU may calculate the braking torque $T_b$ required by the vehicle by using the following formula (1):

$$T_b = \frac{[(M_{st} + n*M_{rot})*k*|\alpha|]*R}{n*K_n*K_r} \quad (1)$$

where, $\alpha$ is the deceleration required by braking, k is an equivalent deceleration coefficient, $M_{st}$ is a static mass of an entire vehicle, $M_{rot}$ is a single-vehicle rotating mass, n is a formation of the vehicle, R is a wheel radius, $K_n$ is efficiency of a vehicle speed reducer, and $K_r$ is a speed reduction ratio of the speed reducer. In this example, the vehicle mass may be $(M_{st}+n*M_{rot})$.

In some embodiments, the determining whether to control the vehicle to unload the electric braking torque, and whether to control the vehicle to apply a mechanical braking torque according to the current vehicle speed, the braking torque required by the vehicle, the deceleration required by braking, and the current gradient includes: calculating an electric braking exit speed according to the braking torque required by the vehicle, the deceleration required by braking, and the current gradient, and controlling the vehicle to unload the electric braking torque when the current vehicle speed is less than the electric braking exit speed.

In some embodiments, after the electric braking exit speed is calculated, the vehicle may be controlled to unload the electric braking torque when the current vehicle speed of the vehicle is reduced to the electric braking exit speed. Although the electric braking torque starts to be unloaded, electric braking still exists, and the vehicle speed continues to be reduced. In this process, the vehicle speed is less than the electric braking exit speed, so that the electric braking torque may be continuously unloaded.

In an example, the calculating an electric braking exit speed according to the braking torque required by the vehicle, the deceleration required by braking, and the current gradient includes: obtaining an unloading rate of the electric braking torque and a current ground adhesion coefficient; and calculating the electric braking exit speed according to the braking torque required by the vehicle, the unloading rate of the electric braking torque, the deceleration required by braking, the current ground adhesion coefficient, and the current gradient.

Figure 3:
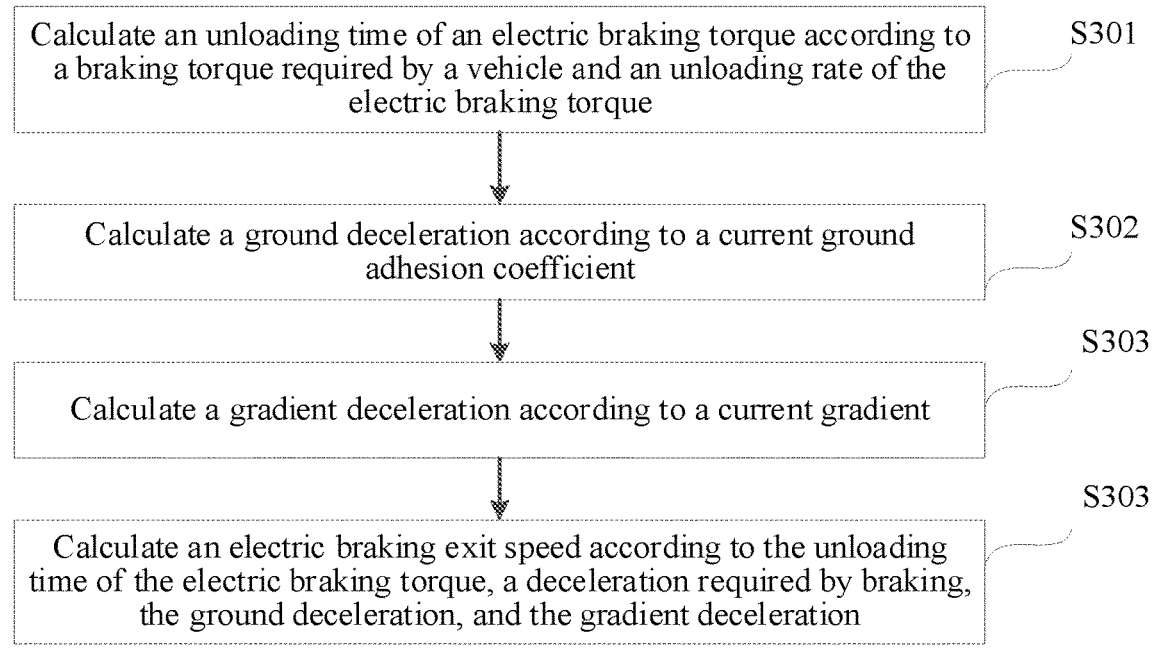
FIG. 3 is an exemplary flowchart of a method for calculating an electric braking exit speed according to the disclosure.

In this example, as shown in FIG. 3, calculation steps of the electric braking exit speed are as follows:

S301. Calculate an unloading time of the electric braking torque according to the braking torque required by the vehicle and the unloading rate of the electric braking torque.

In some embodiments, the electric braking exit speed may be calculated with a design goal that the vehicle speed is just zero when the electric braking torque is completely unloaded. In this case, the electric braking torque starts to be unloaded, the vehicle speed is the electric braking exit speed, and the unloading time of the electric braking torque may be calculated by using the following formula (2):

$$t_u = T_b/K_u \quad (2)$$

where, $t_u$ is the unloading time of the electric braking torque, and $K_u$ is the unloading rate of the electric braking torque.

S302. Calculate a ground deceleration according to the current ground adhesion coefficient.

S303. Calculate a gradient deceleration according to the current gradient.

In some embodiments, in the vehicle braking process, an acceleration component in a slope surface direction caused by a ground friction force and a gradient includes the ground deceleration and the gradient deceleration, and may affect the driving of the vehicle and change the vehicle speed of the vehicle. The ground deceleration $\alpha_r$ (namely, a deceleration caused by a rolling friction force) may be calculated according to the current ground adhesion coefficient and the current vehicle mass; and a gradient deceleration $\alpha_g$ may be calculated by using the following formula (3):

$$\alpha_g = g*\theta \quad (3)$$

where, g is a gravitational acceleration, and $\theta$ is the current gradient. When the gradient is relatively small, it may be approximately considered that $\theta=\sin\theta=\tan=$. Therefore, the gradient deceleration $\alpha_g$ may be approximately equal to $g*\theta$.

S304. Calculate the electric braking exit speed according to the unloading time of the electric braking torque, the deceleration required by braking, the ground deceleration, and the gradient deceleration.

In this example, because the electric braking torque is unloaded according to a fixed rate $K_u$, an entire unloading process of the electric braking torque may approximate to a uniformly changed deceleration process with constant deceleration change plus a uniform deceleration process with a constant deceleration (mainly being a ramp and resistance process).

Figure 4A:
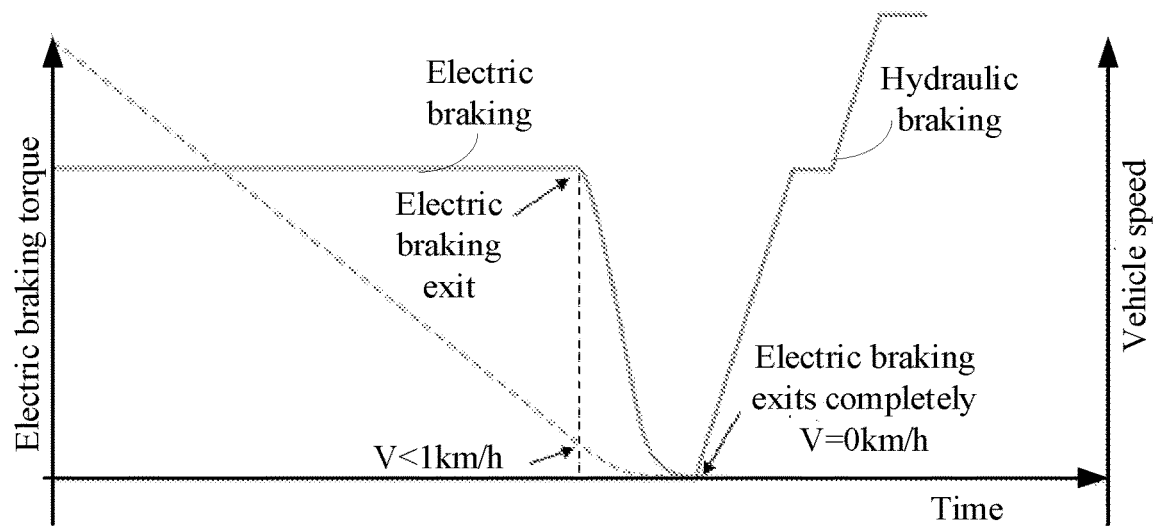
FIG. 4(a) is an exemplary schematic diagram of a vehicle braking process according to the disclosure.

In some embodiments, when θ is zero, in the vehicle braking process, states of electric braking and mechanical braking of the vehicle are shown in FIG. 4(a). After the electric braking torque is completely unloaded, the vehicle speed of the vehicle is zero, and the vehicle is controlled to apply the mechanical braking torque. In this case, the electric braking exit speed $V_{edf}$ $V_{edf}$ may be calculated by using the following formula (4):

$$V_{edf}=k*|\alpha/2|*t+a_r \quad (4)$$

where, the uniformly changed deceleration process may be approximately equivalent to a uniform deceleration process with an average deceleration $$k*\left|\frac{\alpha}{2}\right|.$$

Figure 4B:
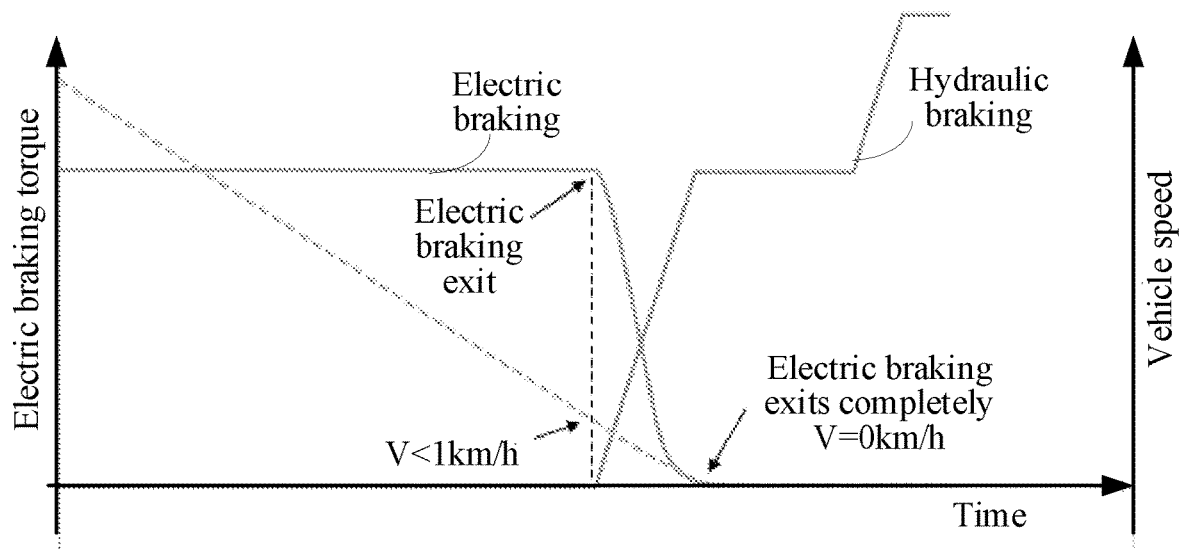
FIG. 4(b) is another exemplary schematic diagram of a vehicle braking process according to the disclosure.

When θ is not zero, in the vehicle braking process, the states of electric braking and mechanical braking of the vehicle are shown in FIG. 4(b). If the electric braking torque is unloaded, the mechanical braking needs to be applied synchronously, so as to ensure a constant sum of the electric braking torque and the mechanical braking torque, that is, the braking torque is always the braking torque required by the vehicle in the braking process. In this case, it may be considered that the deceleration is unchanged in an unloading process of the electric braking torque, and the electric braking exit speed $V_{edf}$ may be calculated by using the following formula (5):

$$V_{edf}=k*|\alpha|*t+(a_r+a_g)*t \quad (5)$$

The following may be obtained by substituting the unloading time $t_u$ of the electric braking torque (in this case, $t=t_u$), the braking torque $T_b$ required by the vehicle, and the ground deceleration $\alpha_r$ that are calculated above into the formula (4):

$$V_{edf} = \frac{[(M_{st} + n*M_{rot})*k*|\alpha|]*R}{n*K_n*K_r*K_u} * \left(k*\left|\frac{\alpha}{2}\right| + a_r\right), \theta = 0 \quad (6)$$

The following may be obtained by substituting the unloading time $t_u$ of the electric braking torque (in this case, $t=t_o$), the braking torque $T_b$ required by the vehicle, the ground deceleration $\alpha_r$, and the gradient deceleration $\alpha_g$ that are calculated above into the formula (5):

$$V_{edf} = \frac{[(M_{st} + n*M_{rot})*k*|\alpha|]*R}{n*K_n*K_r*K_u} * (k*|\alpha| + a_r + a_g), \theta \neq 0 \quad (7)$$

In some embodiments, the determining whether to control the vehicle to unload the electric braking torque, and whether to control the vehicle to apply a mechanical braking torque according to the current vehicle speed, the braking torque required by the vehicle, the deceleration required by braking, and the current gradient includes: if the current gradient is not zero, calculating a mechanical braking application speed according to the braking torque required by the vehicle, the deceleration required by braking, and the current gradient, and controlling the vehicle to apply the mechanical braking torque when the current vehicle speed is less than the mechanical braking application speed.

For example, if the current gradient is not zero, the mechanical braking torque may be applied while the electric braking torque starts to be unloaded. In this case, the mechanical braking application speed is equal to the electric braking exit speed, and the mechanical braking application speed may be calculated according to the method for calculating the electric braking exit speed when the current gradient is not zero. Further, when the current vehicle speed is reduced to the mechanical braking application speed, the vehicle is controlled to start to apply the mechanical braking torque. The vehicle speed continues to be reduced with continuous braking. In this process, the vehicle speed is less than the mechanical braking application speed, and the vehicle is continuously controlled to apply the mechanical braking torque.

In an example, when the current gradient is not zero, the mechanical braking application speed is calculated according to the braking torque required by the vehicle, the deceleration required by braking, and the current gradient. When the current vehicle speed is less than the mechanical braking application speed, if the vehicle is controlled to apply the mechanical braking torque, in an aspect, the unloading rate of the electric braking torque may be obtained, and the vehicle is controlled to apply the mechanical braking torque according to the unloading rate of the electric braking torque; and in another aspect, a current electric braking torque may be obtained, and the vehicle is controlled to apply the mechanical braking torque according to the braking torque required by the vehicle and the current electric braking torque.

In some embodiments, when the BCU controls the vehicle to apply the mechanical braking torque, in an aspect, an application rate of the mechanical braking torque may be obtained according to the unloading rate of the electric braking torque. For example, the application rate of the mechanical braking torque may be equal to the unloading rate of the electric braking torque. In another aspect, a mechanical braking torque may be obtained according to the braking torque required by the vehicle and the current electric braking torque. For example, a sum of a current mechanical braking torque and the current electric braking torque is the same, thereby ensuring that the braking torque is always the braking torque required by the vehicle in the braking process.

Certainly, the BCU may alternatively set that the application rate of the mechanical braking torque is less than the unloading rate of the electric braking torque as required, or set that the sum of the current mechanical braking torque and the current electric braking torque changes according to a specific rule, for example, first gradually increases, and then gradually decreases.

In some embodiments, the mechanical braking torque is provided by a hydraulic brake system, and the controlling the vehicle to apply the mechanical braking torque includes: obtaining second state information of the vehicle, where the second state information includes a kinetic friction coefficient, a brake disc radius, and a clamp port area; and controlling the hydraulic brake system to apply a hydraulic brake pressure, to apply the mechanical braking torque according to the unloading rate of the electric braking torque, the first state information, and the second state information; or, controlling the hydraulic brake system to apply the hydraulic brake pressure, to apply the mechanical braking torque according to the braking torque required by the vehicle, the current electric braking torque, the first state information, and the second state information.

In some embodiments, in addition to obtaining the first state information of the vehicle as the TCU does, the BCU further obtains the second state information of the vehicle, where the second state information includes a kinetic friction coefficient $\mu_d$, a brake disc radius $r_d$, and a clamp port area S. Meanwhile, the BCU may further obtain a mechanical braking torque $T_{bm}$ according to the unloading rate of the electric braking torque, where the mechanical braking torque $T_{bm}$ is equal to a product of the application rate of the mechanical braking torque and a duration of applying the mechanical braking torque, and the application rate of the mechanical braking torque is equal to the unloading rate of the electric braking torque; or, obtain the mechanical braking torque $T_{bm}$ according to the braking torque required by the vehicle and the current electric braking torque, where the mechanical braking torque $T_{bm}$ is equal to the braking torque required by the vehicle minus the current electric braking torque. Then, the hydraulic brake pressure applied by the hydraulic brake system may be calculated according to the mechanical braking torque $T_{bm}$, and the first state information and the second state information of the vehicle, so as to apply the mechanical braking torque according to the hydraulic brake pressure. A calculation formula of the hydraulic brake pressure is as follows:

$$P = \frac{T_{bm}}{8 * \mu_d * r_d * S} * 10^{-5} \quad (8)$$

In some embodiments, the determining whether to control the vehicle to unload the electric braking torque, and whether to control the vehicle to apply a mechanical braking torque according to the current vehicle speed, the braking torque required by the vehicle, the deceleration required by braking, and the current gradient further includes: if the current gradient is zero, controlling the vehicle to apply the mechanical braking torque when the current vehicle speed of the vehicle is zero. In this way, vehicle braking may be implemented by maximizing the use of electric braking, and the mechanical braking application in the entire braking process may be reduced, thereby effectively avoiding the wear of mechanical device and mechanical shock.

In some embodiments, the determining whether to control the vehicle to unload the electric braking torque, and whether to control the vehicle to apply a mechanical braking torque according to the current vehicle speed, the braking torque required by the vehicle, the deceleration required by braking, and the current gradient includes: if the current gradient is not zero, controlling a sum of the electric braking torque and the mechanical braking torque to be equal to the braking torque required by the vehicle. In this way, the vehicle is more stable in the braking process, and riding comfort for users is improved.

Figure 5:
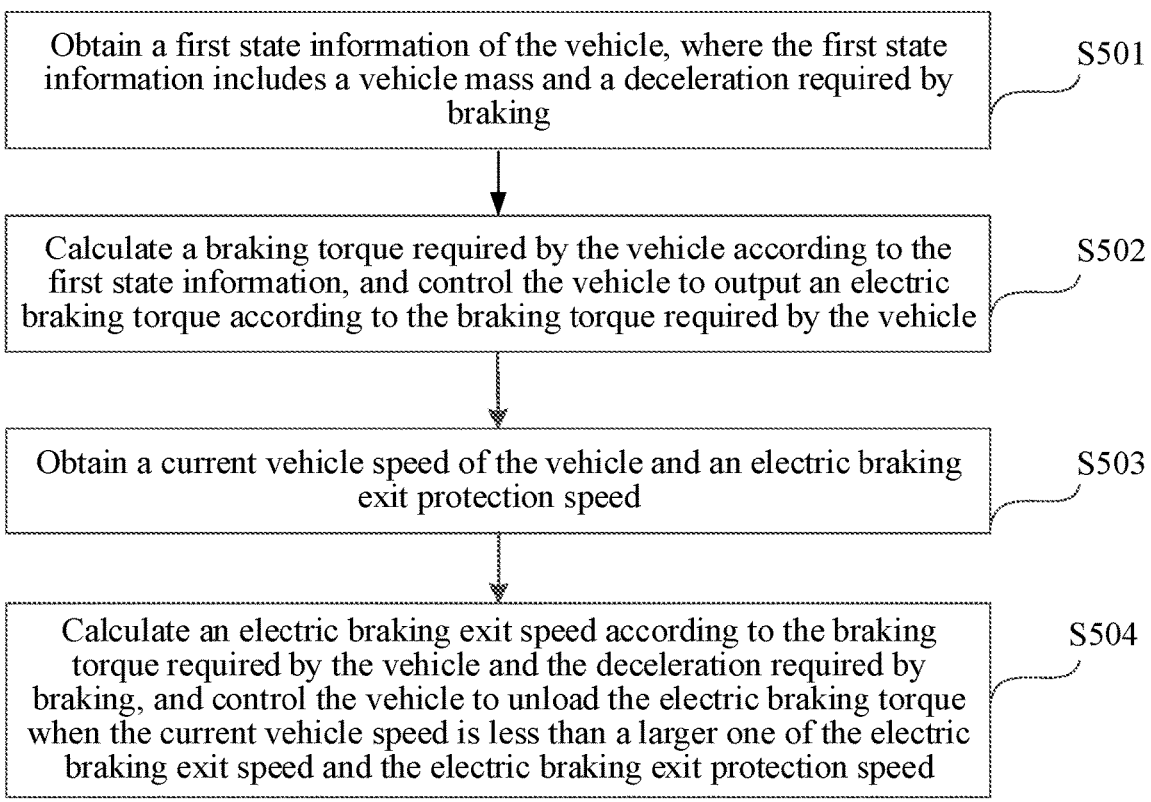
FIG. 5 is a flowchart of a braking method for a vehicle according to a second specific embodiment of the disclosure.

It can be learned by analyzing the formula (5) or the formula (7) that, when a value of the gradient deceleration $\alpha_g$ is a relatively large negative value, namely, when the vehicle is located at a relatively steep ramp, it is possible that the electric braking exit speed $V_{edf}$ is very small, or even a negative value. However, because the unloading rate of the electric braking torque is limited and a vehicle speed of a vehicle moving forward is a non-negative value, it is possible that the electric braking torque still has not been completely unloaded or even the unloading of the electric braking torque cannot be triggered when the vehicle decelerates to zero. In this case, the vehicle has the risk of slipping or the motor has the risk of stalling. To avoid the risk, the disclosure sets an electric braking exit protection speed $V_{prot}$. In some embodiments of the disclosure, as shown in FIG. 5, the braking method for a vehicle includes the following steps:

S501. Obtain a first state information of the vehicle, where the first state information includes a vehicle mass and a deceleration required by braking.

S502. Calculate a braking torque required by the vehicle according to the first state information, and control the vehicle to output an electric braking torque according to the braking torque required by the vehicle.

S503. Obtain a current vehicle speed of the vehicle and an electric braking exit protection speed.

The electric braking exit protection speed $V_{prot}$ may be a minimum value selected from a controllable range according to motor torque control precision and motor rotational speed acquisition precision. A specific value may be set according to a motor and the TCU used by the vehicle.

S504. Calculate an electric braking exit speed according to the braking torque required by the vehicle and the deceleration required by braking, and control the vehicle to unload the electric braking torque when the current vehicle speed is less than a larger one of the electric braking exit speed and the electric braking exit protection speed.

For a calculation formula of the electric braking exit speed, reference may be made to the formula (6) and the formula (7), and details are not described herein again.

Therefore, when the electric braking torque is unloaded, by setting the electric braking exit protection speed, the precision of vehicle braking control can be improved, and the risk of the vehicle slipping backward or the risk of stalling of a drive motor of the vehicle can be eliminated.

Figure 6:
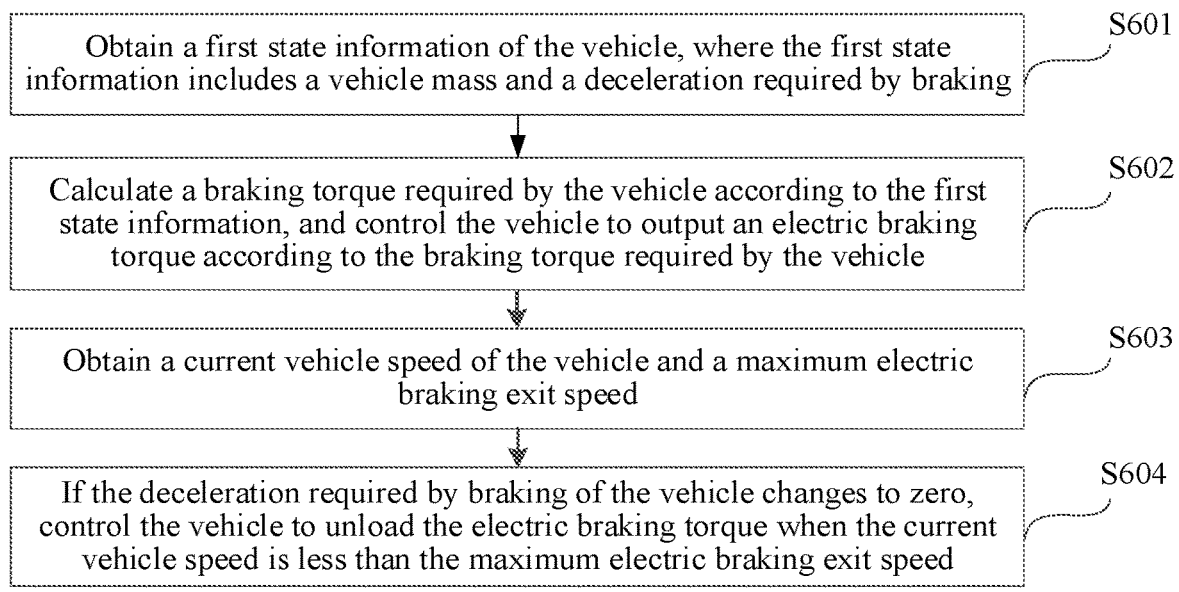
FIG. 6 is a flowchart of a braking method for a vehicle according to a third specific embodiment of the disclosure.

According to comfort requirements, a specified jerk rate $\lambda_{jerk}$ of the vehicle needs to meet specific requirements. As a result, both the application and the unloading of the electric braking torque under normal conditions need to be performed at a relatively small rate. When the deceleration required by braking is canceled before the current vehicle speed reaches the electric braking exit speed, or when an unloading speed of the electric braking torque is relatively low, and a case that the vehicle speed is zero but the electric braking torque has not been completely unloaded occurs, the drive motor may output a reverse torque, which may cause reverse traction of the vehicle. In view of this, the disclosure sets a maximum electric braking exit speed for corresponding protection. In some embodiments, as shown in FIG. 6, the braking method for a vehicle includes the following steps:

S601. Obtain first state information of a vehicle, where the first state information includes a vehicle mass and a deceleration required by braking.

S602. Calculate a braking torque required by the vehicle according to the first state information, and control the vehicle to output an electric braking torque according to the braking torque required by the vehicle.

S603. Obtain a current vehicle speed of the vehicle and a maximum electric braking exit speed.

S604. If the deceleration required by braking of the vehicle changes to zero, control the vehicle to unload the electric braking torque when the current vehicle speed is less than the maximum electric braking exit speed.

In an example, the obtaining a maximum electric braking exit speed includes: obtaining a maximum allowable gradient, a maximum allowable vehicle mass, and a maximum allowable deceleration required by braking of the vehicle;

and calculating the maximum electric braking exit speed according to the maximum allowable vehicle mass, the maximum allowable deceleration required by braking, and the maximum allowable gradient.

In an example, the calculating the maximum electric braking exit speed according to the maximum allowable vehicle mass, the maximum allowable deceleration required by braking, and the maximum allowable gradient may include: calculating a maximum allowable braking torque of the vehicle according to the maximum allowable vehicle mass and the maximum allowable deceleration required by braking; and calculating the maximum electric braking exit speed according to the maximum allowable braking torque of the vehicle, the maximum allowable deceleration required by braking, and the maximum allowable gradient.

In an example, the calculating the maximum electric braking exit speed according to the maximum allowable braking torque of the vehicle, the maximum allowable deceleration required by braking, and the maximum allowable gradient includes: obtaining an unloading rate of the electric braking torque and a current ground adhesion coefficient; and calculating the maximum electric braking exit speed according to the maximum allowable braking torque of the vehicle, the unloading rate of the electric braking torque, the maximum allowable deceleration required by braking, the current ground adhesion coefficient, and the maximum allowable gradient.

In an example, the calculating the maximum electric braking exit speed according to the maximum allowable braking torque of the vehicle, the unloading rate of the electric braking torque, the maximum allowable deceleration required by braking, the current ground adhesion coefficient, and the maximum allowable gradient includes: calculating a maximum allowable unloading time of the electric braking torque according to the maximum allowable braking torque of the vehicle and the unloading rate of the electric braking torque; calculating a ground deceleration according to the current ground adhesion coefficient; calculating a maximum allowable gradient deceleration according to the maximum allowable gradient; and calculating the maximum electric braking exit speed according to the maximum allowable unloading time of the electric braking torque, the maximum allowable deceleration required by braking, the ground deceleration, and the maximum allowable gradient deceleration.

For example, a maximum electric braking exit speed $v_{ed\ max}$, namely, a maximum speed in a case that the unloading of the electric braking torque satisfies comfort requirements, may be calculated by substituting the maximum allowable vehicle mass, the maximum allowable deceleration required by braking, and the maximum allowable gradient of the vehicle into the formula (5).

In this embodiment, the unloading rate Ku of the electric braking torque may be a maximum unloading rate of the electric braking torque, and to ensure the riding comfort, a comfortable unloading rate Kv of the electric braking torque may be further set, where Kv is less than Ku. After the deceleration required by braking is canceled, the electric braking torque is unloaded immediately at Ku; and when the current vehicle speed reduces to the maximum electric braking exit speed $V_{ed\ max}$, the electric braking torque is unloaded rapidly at Kv, so that the riding may be more comfortable.

In an example, the braking method for a vehicle may further include: obtaining a current gradient of the vehicle; calculating an electric braking exit speed according to the braking torque required by the vehicle, the deceleration required by braking, and the current gradient; and if the electric braking exit speed is less than zero, controlling the vehicle to unload the electric braking torque when the current vehicle speed is less than the maximum electric braking exit speed.

It should be noted that, the electric braking exit speed$^{vedf}$ less than zero usually occurs only when the gradient is very large. In this case, if the electric braking torque is unloaded when the current vehicle speed is less than the electric braking exit protection speed$v_{prot}$, due to delay of mechanical braking, it is possible that the mechanical braking is not supplemented in time, which results in an insufficient total braking torque when the vehicle speed reaches zero, to cause slipping backward of the vehicle. If the electric braking torque is unloaded when the current vehicle speed is less than the maximum electric braking exit speed $V_{ed\ max}$, the unloading time of the electric braking torque is longer because unloading rates are the same, which facilitates supplement of the mechanical braking.

Therefore, when the electric braking torque is unloaded, by setting the maximum electric braking exit speed, the precision of vehicle braking control can be improved, and the risk of reverse traction of a drive motor of the vehicle can be eliminated.

Figure 7:
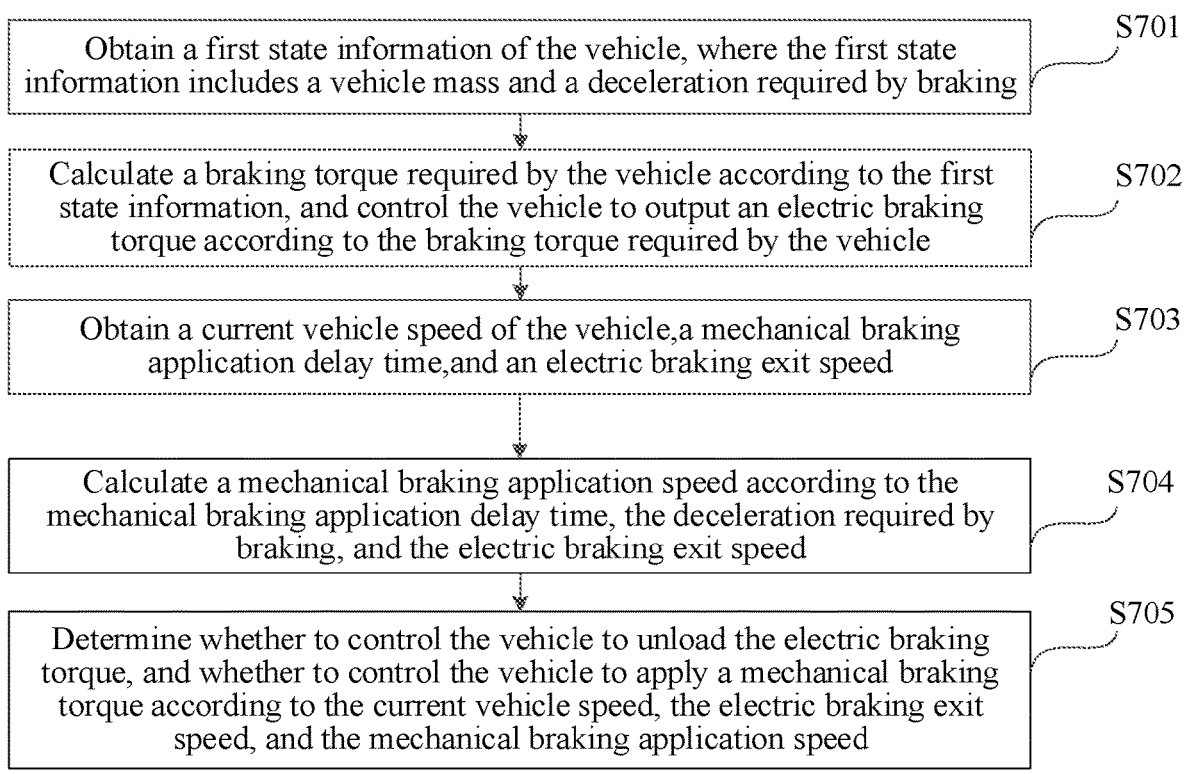
FIG. 7 is a flowchart of a braking method for a vehicle according to a fourth specific embodiment of the disclosure.

Due to the delay of application of the mechanical braking torque (for example, a delay time is $\Delta t1$), a vehicle speed when the BCU starts to apply the mechanical braking torque is higher than a vehicle speed when the electric braking torque starts to be unloaded, that is, a speed difference denoted as $\Delta v$, exists between the two vehicle speeds. To ensure real-time response to vehicle requirements, in some embodiments of the disclosure, as shown in FIG. 7, the braking method for a vehicle includes the following steps:

S701. Obtain a first state information of the vehicle, where the first state information includes a vehicle mass and a deceleration required by braking.

S702. Calculate a braking torque required by the vehicle according to the first state information, and control the vehicle to output an electric braking torque according to the braking torque required by the vehicle.

S703. Obtain a current vehicle speed of the vehicle, a mechanical braking application delay time, and an electric braking exit speed.

For a calculation formula of the electric braking exit speed, reference may be made to the formula (6) and the formula (7), and details are not described herein again.

S704. Calculate a mechanical braking application speed according to the mechanical braking application delay time, the deceleration required by braking, and the electric braking exit speed.

In an example, the calculating a mechanical braking application speed according to the mechanical braking application delay time, the deceleration required by braking, and the electric braking exit speed includes: calculating a speed difference according to the mechanical braking application delay time and the deceleration required by braking; and calculating the mechanical braking application speed according to the speed difference and the electric braking exit speed.

In some embodiments, in a mechanical braking application delay time $\Delta t1$, because the electric braking torque is not unloaded, the braking deceleration is constant, and the vehicle is in a state of uniform deceleration. In this case, a speed difference $\Delta v$ may be calculated by using the following formula (9):

$$\Delta v = 3.6 * \Delta t1 * (k*|\alpha|+a_r+a_g) \qquad (9)$$

A mechanical braking application speed $V_{eha}$ may be calculated by using the following formula (10):

$$V_{eha} = V_{edf} + \Delta v \tag{10}$$

S705. Determine whether to control the vehicle to unload the electric braking torque, and whether to control the vehicle to apply a mechanical braking torque according to the current vehicle speed, the electric braking exit speed, and the mechanical braking application speed.

In some embodiments, the vehicle is controlled to unload the electric braking torque when the current vehicle speed is less than the electric braking exit speed, and the vehicle is controlled to apply the mechanical braking torque when the current vehicle speed is less than the mechanical braking application speed. In this way, the connection between the unloading of the electric braking torque and the application of the mechanical braking torque can be realized, thereby ensuring rapid response to the vehicle requirements and a braking effect of the vehicle.

Figure 8:
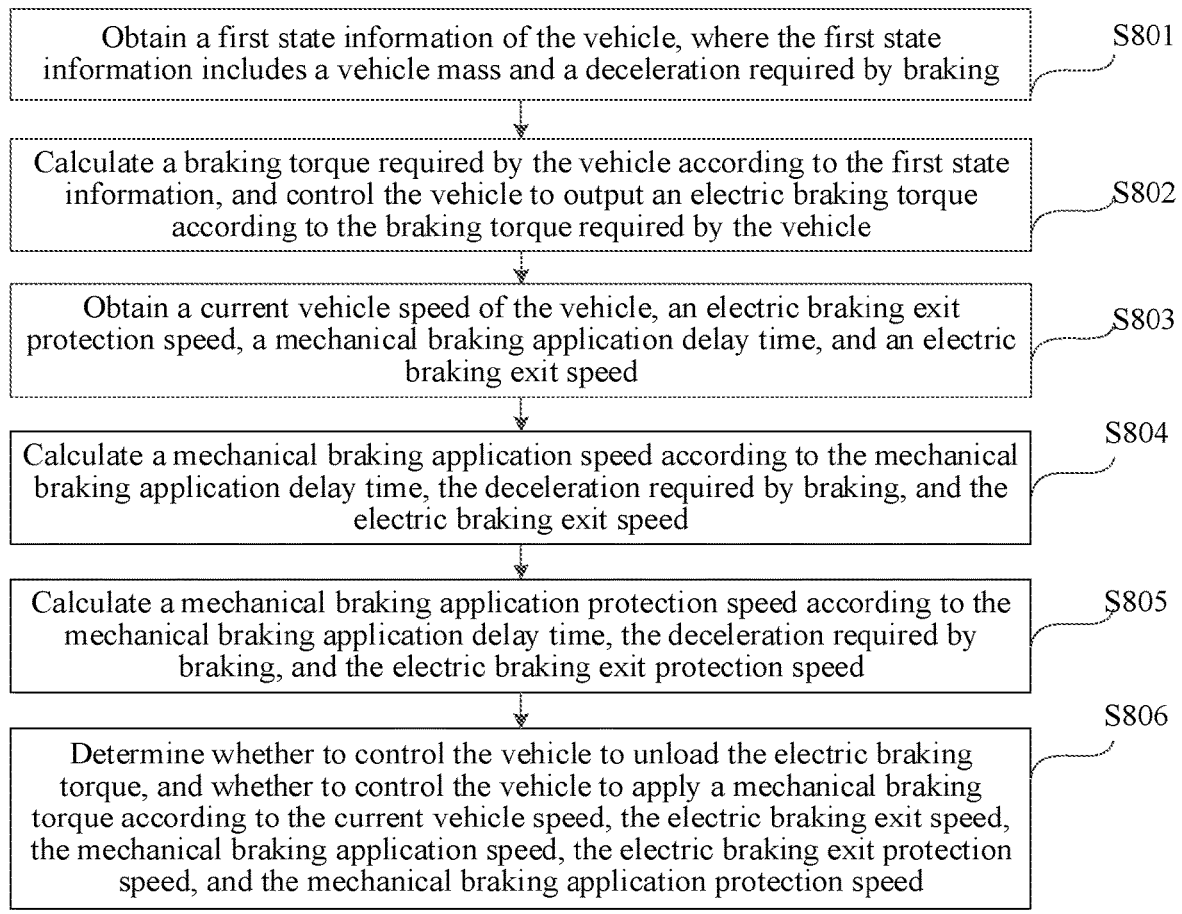
FIG. 8 is a flowchart of a braking method for a vehicle according to a fifth specific embodiment of the disclosure.

In some embodiments, as shown in FIG. 8, the braking method for a vehicle further includes the following steps:

S801. Obtain a first state information of the vehicle, where the first state information includes a vehicle mass and a deceleration required by braking.

S802. Calculate a braking torque required by the vehicle according to the first state information, and control the vehicle to output an electric braking torque according to the braking torque required by the vehicle.

S803. Obtain a current vehicle speed of the vehicle, an electric braking exit protection speed, a mechanical braking application delay time, and an electric braking exit speed.

For a calculation formula of the electric braking exit speed, reference may be made to the formula (6) and the formula (7), and details are not described herein again.

S805. Calculate a mechanical braking application speed according to the mechanical braking application delay time, the deceleration required by braking, and the electric braking exit speed.

For a calculation formula of the mechanical braking application speed, reference may be made to the formula (10), and details are not described herein again.

S805. Calculate a mechanical braking application protection speed according to the mechanical braking application delay time, the deceleration required by braking, and the electric braking exit protection speed.

In an example, the calculating a mechanical braking application protection speed according to the mechanical braking application delay time, the deceleration required by braking, and the electric braking exit protection speed includes: calculating a speed difference according to the mechanical braking application delay time and the deceleration required by braking; and calculating the mechanical braking application protection speed according to the speed difference and the electric braking exit protection speed.

In some embodiments, after a speed difference $\Delta v$ is calculated by using the above formula (9), a mechanical braking application protection speed $V_{ehp}$ may be calculated by using the following formula (11):

$$V_{ehp} = V_{prot} + \Delta v \tag{11}$$

S806. Determine whether to control the vehicle to unload the electric braking torque, and whether to control the vehicle to apply a mechanical braking torque according to the current vehicle speed, the electric braking exit speed, the mechanical braking application speed, the electric braking exit protection speed, and the mechanical braking application protection speed.

In some embodiments, the vehicle is controlled to unload the electric braking torque when the current vehicle speed is less than a larger one of the electric braking exit speed and the electric braking exit protection speed, and the vehicle is controlled to apply the mechanical braking torque when the current vehicle speed is less than a larger one of the mechanical braking application speed and the mechanical braking application protection speed. In this way, the connection between the unloading of the electric braking torque and the application of the mechanical braking torque can be better realized, thereby better ensuring rapid response to the vehicle requirements and a braking effect of the vehicle.

In this embodiment, the braking method for a vehicle further includes: obtaining a current gradient of the vehicle; and determining whether to control the vehicle to unload the electric braking torque, and whether to control the vehicle to apply a mechanical braking torque according to the current vehicle speed, the current gradient, the electric braking exit speed, the mechanical braking application speed, the electric braking exit protection speed, and the mechanical braking application protection speed.

The determining whether to control the vehicle to unload the electric braking torque, and whether to control the vehicle to apply a mechanical braking torque according to the current vehicle speed, the current gradient, the electric braking exit speed, the mechanical braking application speed, the electric braking exit protection speed, and the mechanical braking application protection speed includes: obtaining an unloading rate of the electric braking torque; and if the current gradient is not zero, unloading the electric braking torque according to the unloading rate of the electric braking torque when the current vehicle speed is less than the larger one of the electric braking exit speed and the electric braking exit protection speed; and controlling the vehicle to apply the mechanical braking torque according to the unloading rate of the electric braking torque when the current vehicle speed is less than the larger one of the mechanical braking application speed and the mechanical braking application protection speed; or, obtaining a current electric braking torque, and controlling the vehicle to apply the mechanical braking torque according to the braking torque required by the vehicle and the current electric braking torque.

In some embodiments, the determining whether to control the vehicle to unload the electric braking torque, and whether to control the vehicle to apply a mechanical braking torque according to the current vehicle speed, the current gradient, the electric braking exit speed, the mechanical braking application speed, the electric braking exit protection speed, and the mechanical braking application protection speed may further include: if the current gradient is zero, controlling the vehicle to apply the mechanical braking torque when the current vehicle speed of the vehicle is zero; and if the current gradient is not zero, controlling a sum of the electric braking torque and the mechanical braking torque to be equal to the braking torque required by the vehicle.

Figure 9:
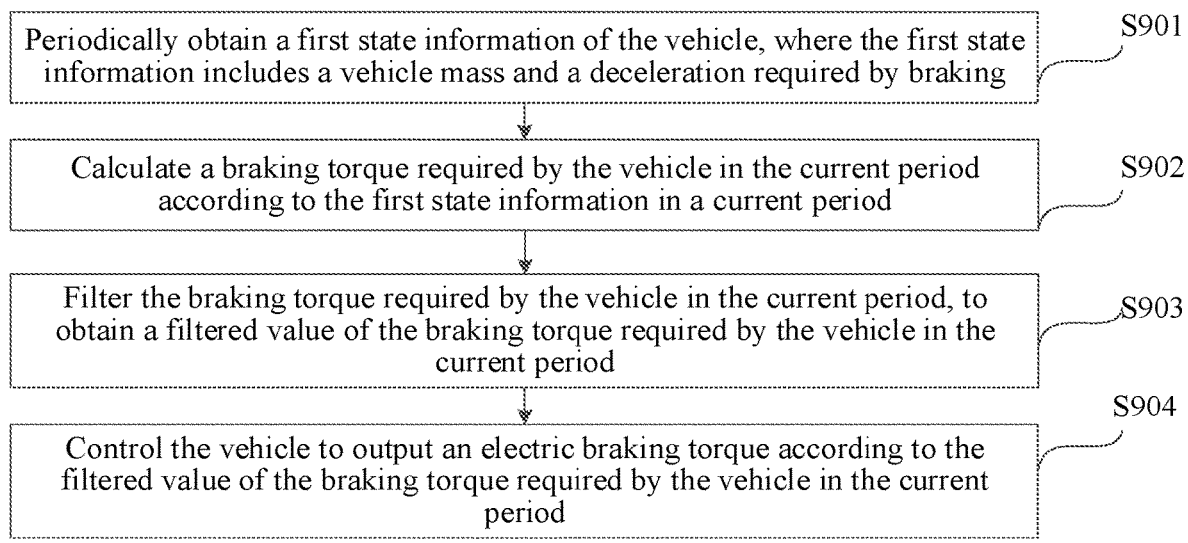
FIG. 9 is a flowchart of a braking method for a vehicle according to a sixth specific embodiment of the disclosure.

To prevent a sudden change in torque that may occur when the electric braking torque is unloaded from causing damage to the comfort of the entire vehicle, the calculated braking torque required by the vehicle may be filtered. In some embodiments of the disclosure, as shown in FIG. 9, the braking method for a vehicle includes the following steps:

S901. Periodically obtain a first state information of the vehicle, where the first state information includes a vehicle mass and a deceleration required by braking.

S902. Calculate a braking torque required by the vehicle in a current period according to the first state information in the current period.

S903. Filter the braking torque required by the vehicle in the current period, to obtain a filtered value of the braking torque required by the vehicle in the current period.

S904. Control the vehicle to output an electric braking torque according to the filtered value of the braking torque required by the vehicle in the current period.

In an example, the filtering the braking torque required by the vehicle in the current period, to obtain a filtered value of the braking torque required by the vehicle in the current period includes: obtaining filtered values of the braking torque required by the vehicle in one or more previous periods; and calculating the filtered value of the braking torque required by the vehicle in the current period according to the braking torque required by the vehicle in the current period and the filtered values of the braking torque required by the vehicle in the one or more previous periods.

In this example, the calculating the filtered value of the braking torque required by the vehicle in the current period according to the braking torque required by the vehicle in the current period and the filtered values of the braking torque required by the vehicle in the one or more previous periods may include: performing arithmetic filtering, square filtering, geometric filtering, or harmonic filtering on the braking torque required by the vehicle in the current period and the filtered values of the braking torque required by the vehicle in the one or more previous periods, to obtain the filtered value of the braking torque required by the vehicle in the current period.

In some embodiments, the filtered value of the braking torque required by the vehicle in the current period may be calculated by using any one of the following formulas:

$$T_{bf[N]} = T_{b[N]} * \beta + T_{bf[N-1]} * (1-\beta) \quad (12\text{-}1)$$

$$T_{bf[N]} = \sqrt{T_{b[N]}^2 * \beta + T_{bf[N-1]}^2 * (1-\beta)} \quad (12\text{-}2)$$

$$T_{bf[N]} = T_{b[N]}^\beta * T_{bf[N-1]}^{(1-\beta)} \quad (12\text{-}3)$$

$$T_{bf[N]} = \frac{1}{\beta * \frac{1}{T_{b[N]}} + (1-\beta) * \frac{1}{T_{bf[N-1]}}} \quad (12\text{-}4)$$

where, $\beta$ is a filtering coefficient, $T_{b[N]}$ is the braking torque required by the vehicle in the current period, $T_{bf[N]}$ is the filtered value of the braking torque required by the vehicle in the current period, and $T_{bf[N-1]}$ is a filtered value of the braking torque required by the vehicle in one previous period; and the formula (12-1) is a formula in a case of using arithmetic filtering, the formula (12-2) is a formula in a case of using square filtering, the formula (12-3) is a formula in a case of using geometric filtering, and the formula (12-4) is a formula in a case of using harmonic filtering.

The filtered value of the braking torque required by the vehicle in the current period may alternatively be calculated by using any one of the following formulas:

$$T_{bf[N]} = T_{b[N]} * \beta_1 + T_{bf[N-1]} * \beta_2 + \ldots + T_{bf[N-M]} * \beta_{M+1} \quad (12\text{-}5)$$

$$T_{bf[N]} = \sqrt{T_{b[N]}^2 * \beta_1 + T_{bf[N-1]}^2 * \beta_2 + \ldots + T_{bf[N-M]}^2 * \beta_{M+1}} \quad (12\text{-}6)$$

$$T_{bf[N]} = T_{b[N]}^{\beta_1} * T_{bf[N-1]}^{\beta_2} * \ldots * T_{bf[N-M]}^{\beta_{M+1}} \quad (12\text{-}7)$$

$$T_{bf[N]} = \frac{1}{\beta_1 \cdot \frac{1}{T_{b[N]}} + \beta_2 \cdot \frac{1}{T_{bf[N-1]}} + \ldots + \beta_{M+1} \cdot \frac{1}{T_{bf[N-M]}}} \quad (12\text{-}8)$$

where, $\beta_1, \beta_2, \ldots \beta_{M+1}$ are filtering coefficients, and $\beta_1, \beta_2, \ldots \beta_{M+1} = 1$; $T_{bf[N-M]}$ is a filtered value of the braking torque required by the vehicle in M previous periods; and the formula (12-5) is a formula in a case of using arithmetic filtering, the formula (12-6) is a formula in a case of using square filtering, the formula (12-7) is a formula in a case of using geometric filtering, and the formula (12-8) is a formula in a case of using harmonic filtering.

In this way, the vehicle is controlled to perform electric braking according to the filtered value of the braking torque required by the vehicle in the current period, so that an actual motor output braking torque changes smoothly, thereby improving the comfort of the entire vehicle.

In an example, the braking method for a vehicle further includes: obtaining a current vehicle speed of the vehicle; and determining whether to control the vehicle to unload the electric braking torque according to the current vehicle speed, the braking torque required by the vehicle in the current period, the filtered value of the braking torque required by the vehicle in the current period, and the deceleration required by braking in the current period.

In this example, an electric braking exit speed in the current period may be calculated according to the braking torque required by the vehicle in the current period, the filtered value of the braking torque required by the vehicle in the current period, and the deceleration required by braking in the current period, and the vehicle may be controlled to unload the electric braking torque when the current vehicle speed is less than the electric braking exit speed in the current period.

The calculating an electric braking exit speed in the current period according to the braking torque required by the vehicle in the current period, the filtered value of the braking torque required by the vehicle in the current period, and the deceleration required by braking in the current period includes: obtaining an unloading rate of the electric braking torque and a current ground adhesion coefficient; and calculating the electric braking exit speed in the current period according to the braking torque required by the vehicle in the current period, the filtered value of the braking torque required by the vehicle in the current period, the unloading rate of the electric braking torque, the deceleration required by braking in the current period, and the current ground adhesion coefficient.

Figure 10:
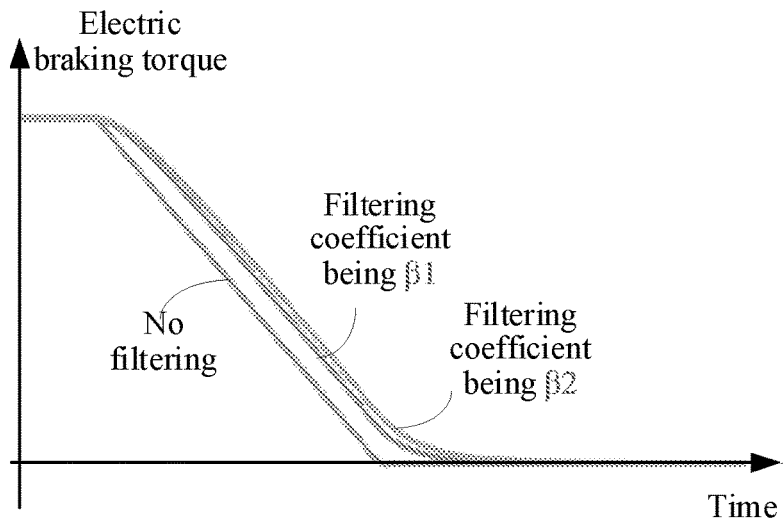
FIG. 10 is an exemplary schematic diagram of an electric braking torque-time curve according to an of the disclosure.

In some embodiments, a torque filtering delay time $\Delta t$ in the current period is obtained; an unloading time of the electric braking torque $t_u$ in the current period is calculated according to the filtered value of the braking torque $T_{bf}$ required by the vehicle in the current period and the unloading rate of the electric braking torque $K_u$, namely, $t_u = T_{bf}/K_u$; a ground deceleration is calculated according to the current ground adhesion coefficient; and the electric braking exit speed in the current period is calculated according to the unloading time of the electric braking torque in the current period, the deceleration required by braking in the current period, the ground deceleration, and the torque filtering delay time in the current period. When values of the filtering coefficient $\beta$ are different, filtered values of the electric braking torque obtained by filtering are different, torque filtering delay times are also different, and change curves of the electric braking torque during unloading are also different, as shown in FIG. 10.

Specifically, the electric braking exit speed may be obtained with reference to the above formulas (4) and (5), namely:

$$V_{edf} = \left(\frac{T_{bf}}{K_u} + \Delta t\right) * \left(k * \left|\frac{\alpha}{2}\right| + a_r\right), \theta = 0 \quad (13)$$

$$V_{edf} = \left(\frac{T_{bf}}{K_u} + \Delta t\right) * (k * |\alpha| + a_r + a_g), \theta \neq 0 \quad (14)$$

For ease of understanding, the above braking method for a vehicle is described below with reference to FIG. 11 to FIG. 13 through a specific embodiment.

Figure 11:
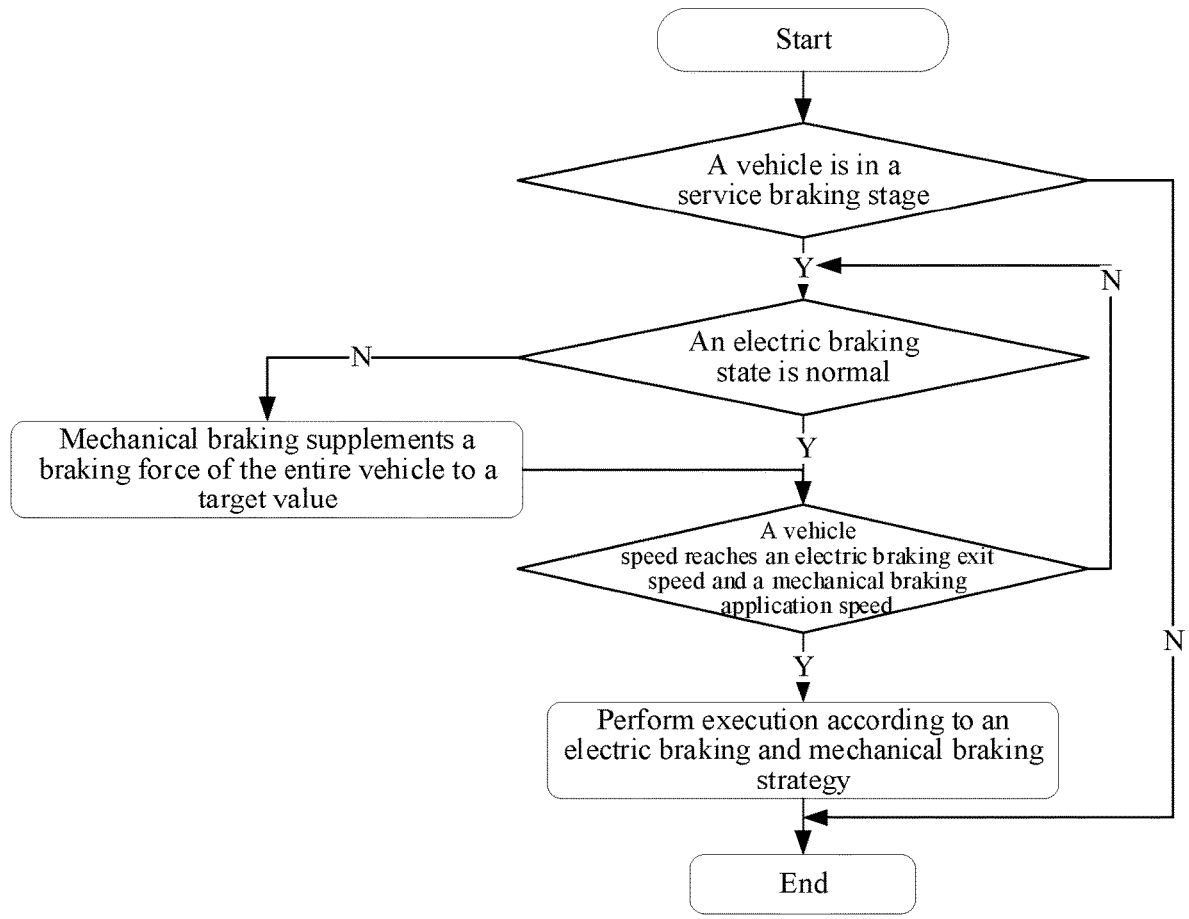
FIG. 11 is an overall flowchart of a braking method for a vehicle according to an embodiment of the disclosure.

As shown in FIG. 11, the TCU and the BCU determine whether a vehicle is in a service braking state; and if the vehicle is in the service braking state, the TCU monitors a state of a drive motor and a vehicle allowed feedback state, and preferentially applies an electric braking torque according to a braking torque required by the vehicle if there is no abnormality. In an electric braking process, the BCU monitors the electric braking torque and the braking torque required by the vehicle fed back by the TCU, and determines whether to apply a mechanical braking torque. In addition, the TCU and the BCU monitor a vehicle speed and state information of the vehicle, determine whether the vehicle speed reaches a speed at which the electric braking torque is unloaded, and/or, whether the vehicle speed reaches a speed at which the mechanical braking torque is applied, and perform corresponding control according to a determination result. The speed at which the electric braking torque is unloaded may be selected as required from one of an electric braking exit speed, an electric braking exit protection speed, and a maximum electric braking exit speed, and the speed at which the mechanical braking torque is applied may be one of a mechanical braking application speed and a mechanical braking application protection speed.

Figure 12:
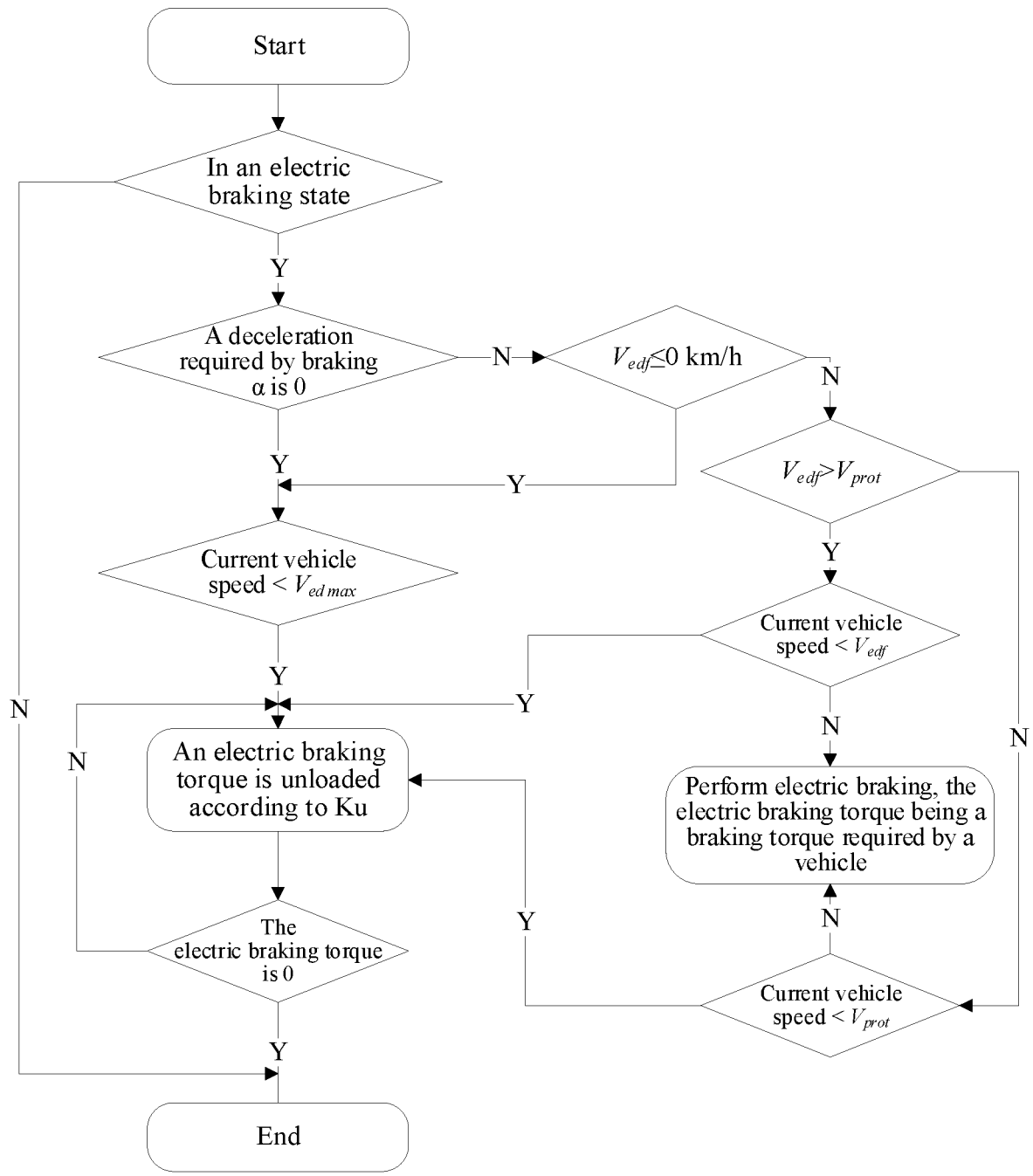
FIG. 12 is a flowchart of electric braking control in a braking method for a vehicle according to an embodiment of the disclosure.

As shown in FIG. 12, when the vehicle is in an electric braking state, it is determined whether a deceleration α required by braking of the vehicle is zero. If the deceleration α required by braking of the vehicle is zero, the vehicle is controlled to unload the electric braking torque according to a rate $K_u$, when a current vehicle speed is less than a maximum electric braking exit speed $V_{ed\ max}$, until the electric braking torque is zero. If the deceleration α required by braking of the vehicle is not zero, it is determined whether a calculated electric braking exit speed $V_{edf}$ is less than or equal to zero. If the calculated electric braking exit speed is less than or equal to zero, the vehicle is controlled to unload the electric braking torque according to a rate $K_u$, when the current vehicle speed is reduced to $V_{ed\ max}$, until the electric braking torque is zero. If the calculated electric braking exit speed is not less than or equal to zero, it is further determined whether $V_{edf}$ is greater than an electric braking exit protection speed $V_{prof}$. If $V_{edf} > V_{prof}$, the vehicle is controlled to unload the electric braking torque according to the rate $K_u$, when the current vehicle speed is reduced to $V_{edf}$, until the electric braking torque is zero; and if $V_{edf} \leq V_{prof}$, the vehicle is controlled to unload the electric braking torque according to the rate $K_u$, when the current vehicle speed is reduced to $V_{prof}$, until the electric braking torque is zero.

Figure 13:
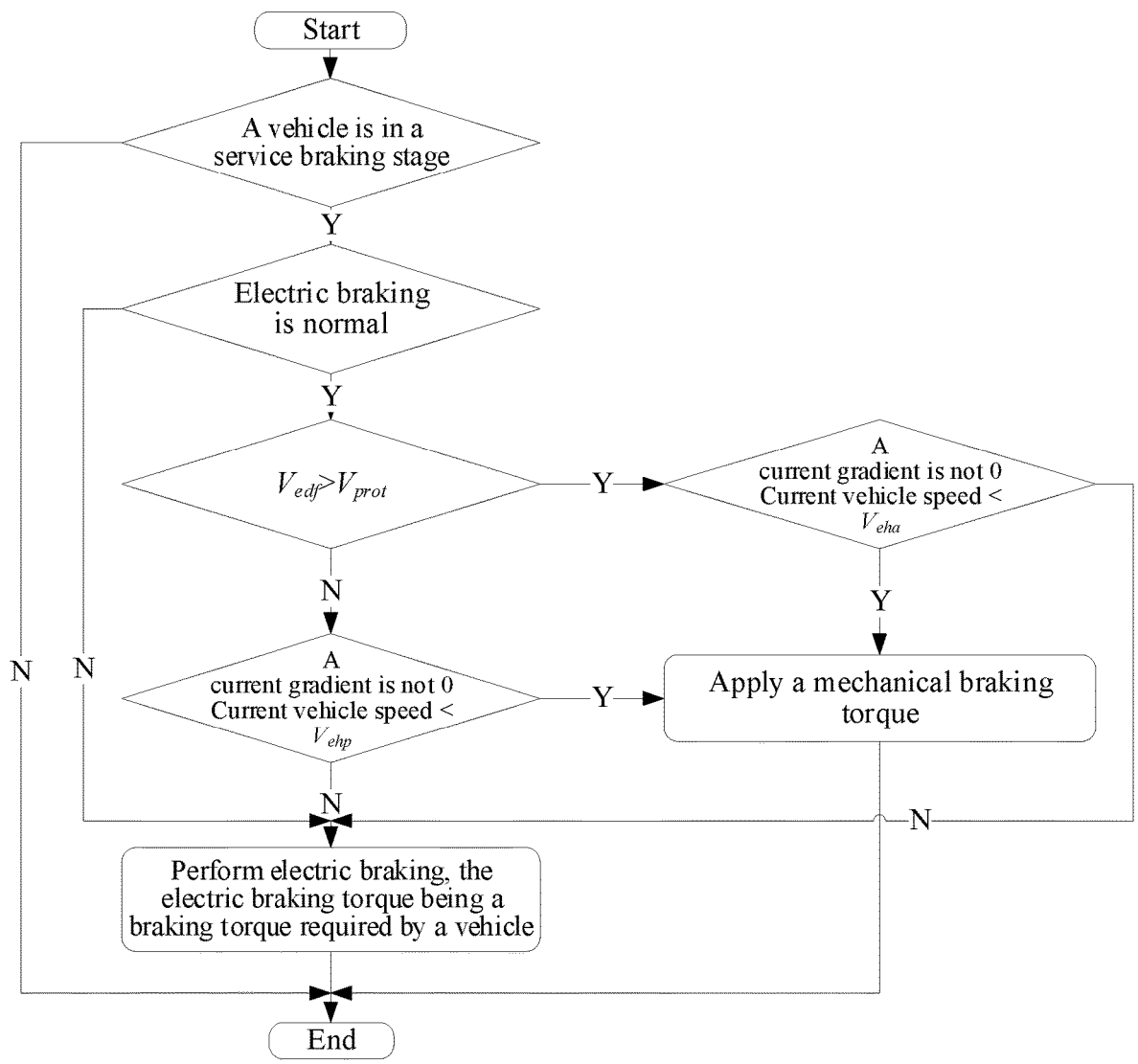
FIG. 13 is a flowchart of mechanical braking control in a braking method for a vehicle according to an embodiment of the disclosure.

As shown in FIG. 13, in the electric braking process, if the current gradient is not zero and $V_{edf} > V_{prof}$, the vehicle is controlled to apply the mechanical braking torque when the current vehicle speed is less than a mechanical braking application speed $V_{eha}$; and if the current gradient is not zero and $V_{edf} \leq V_{prof}$, the vehicle is controlled to apply the mechanical braking torque when the current vehicle speed is less than a mechanical braking application protection speed $V_{ehp}$. In addition, in the electric braking process, if the current gradient is zero, the vehicle is controlled to apply the mechanical braking torque when the electric braking torque is completely unloaded (that is, the current vehicle speed of the vehicle is zero, and there is a parking requirement).

Figure 14:
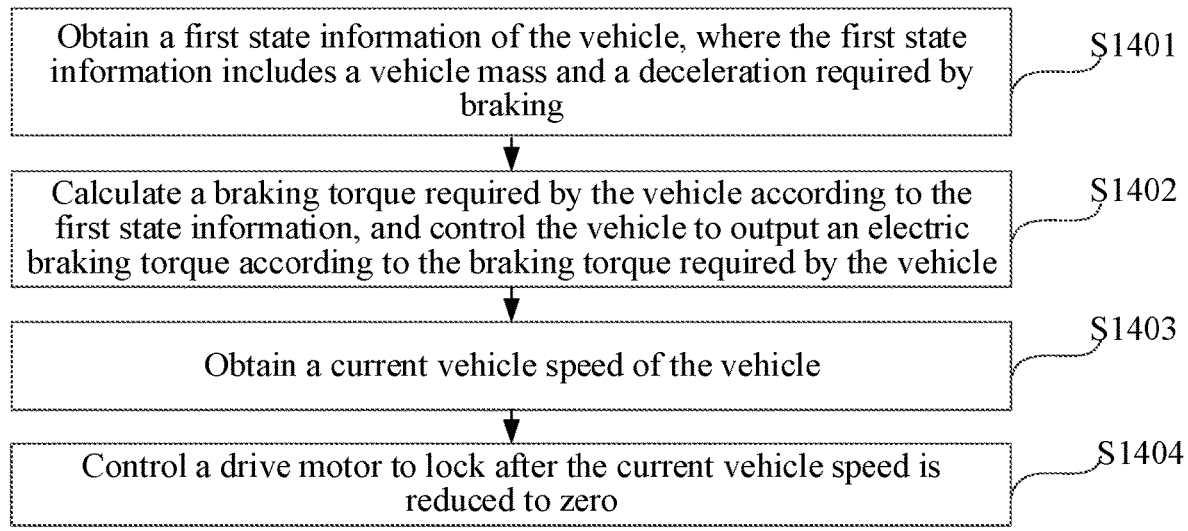
FIG. 14 is a flowchart of a braking method for a vehicle according to a seventh specific embodiment of the disclosure.

In addition, to reduce the wear of a brake disc in the braking process, in some embodiments, as shown in FIG. 14, the braking method for a vehicle further includes the following steps:

S1401. Obtain a first state information of the vehicle, where the first state information includes a vehicle mass and a deceleration required by braking.

S1402. Calculate a braking torque required by the vehicle according to the first state information, and control a drive motor of the vehicle to output an electric braking torque according to the braking torque required by the vehicle.

S1403. Obtain a current vehicle speed of the vehicle.

S1404. Control the drive motor to lock after the current vehicle speed is reduced to zero.

In an example, the drive motor is an alternating current motor, for example, a permanent magnet synchronous motor, where the controlling the drive motor to lock after the current vehicle speed is reduced to zero includes: adjusting a power supply voltage of the drive motor after the current vehicle speed is reduced to zero, so that a stator of the drive motor generates a constant magnetic field, to stall and lock a rotor of the drive motor.

In some embodiments, as shown in FIG. 4(a), before the vehicle speed is reduced to zero, the vehicle is controlled to perform only electric braking; and when the vehicle speed is reduced to zero, the power supply voltage of the drive motor may be adjusted, to stall the drive motor, and ensure that the drive motor is in a locking state within a short time (for example, 2 to 10 s).

In an example, rotational speed closed-loop control is performed on the drive motor when the drive motor of the vehicle is controlled to output the electric braking torque according to the braking torque required by the vehicle.

The performing rotational speed closed-loop control on the drive motor includes: periodically detecting a rotational speed (which includes a size and a direction of the rotational speed) of the rotor of the drive motor, and adjusting a size and a direction of the constant magnetic field generated by the stator according to the rotational speed of the rotor, to stall and lock the rotor of the drive motor.

Specifically, in a process that the drive motor outputs the electric braking torque, the rotational speed of the drive motor may be used as a feedback to control the drive motor, to reduce the vehicle speed to zero, and maintain the vehicle speed of zero for a short time. When the vehicle speed is reduced to zero, the power supply voltage of the drive motor may be adjusted, for example, a direct current may be supplied to the drive motor, thereby forming the constant magnetic field in the stator of the drive motor. When the constant magnetic field interacts with a magnetic field formed by permanent magnets of the rotor, a bar in the rotor cuts the constant magnetic field to generate an induced current, and the rotor forces the rotational speed of the rotor to gradually decrease under the action of an electromagnetic force in the constant magnetic field. When the rotational speed of the rotor is reduced to zero, the rotor no longer cuts the magnetic field, thereby stalling the drive motor, and ensuring that the drive motor is in the locking state within a short time (for example, 2 to 10 s).

That is, when the vehicle speed is reduced to zero, the direct current is supplied to the drive motor, to stall and lock the motor, thereby completing full electric braking during vehicle braking, that is, a braking force in the vehicle braking process is provided by only the electric braking. Therefore, the wear of the brake disc in the braking process can be reduced, the electric braking can be performed accurately and smoothly, and the energy consumption is relatively small.

It should be noted that, there is no absolute guarantee that when the electric braking torque is unloaded to zero, the vehicle speed or the rotational speed of the drive motor is also just zero, and the vehicle may slip backward in this case. Therefore, according to the disclosure, the drive motor is locked for a short time. When the drive motor is locked, the vehicle speed is very low even if it is not zero, and the locking of the drive motor cannot cause obvious jerk. In this case, mechanical braking is applied so that the vehicle can be parked reliably.

In an example, the drive motor is controlled through a two-level three-phase inverter circuit, where the two-level three-phase inverter circuit outputs a three-phase alternating current voltage with variable frequency and amplitude to the drive motor in the process that the drive motor is controlled to output the electric braking torque.

Figure 15:
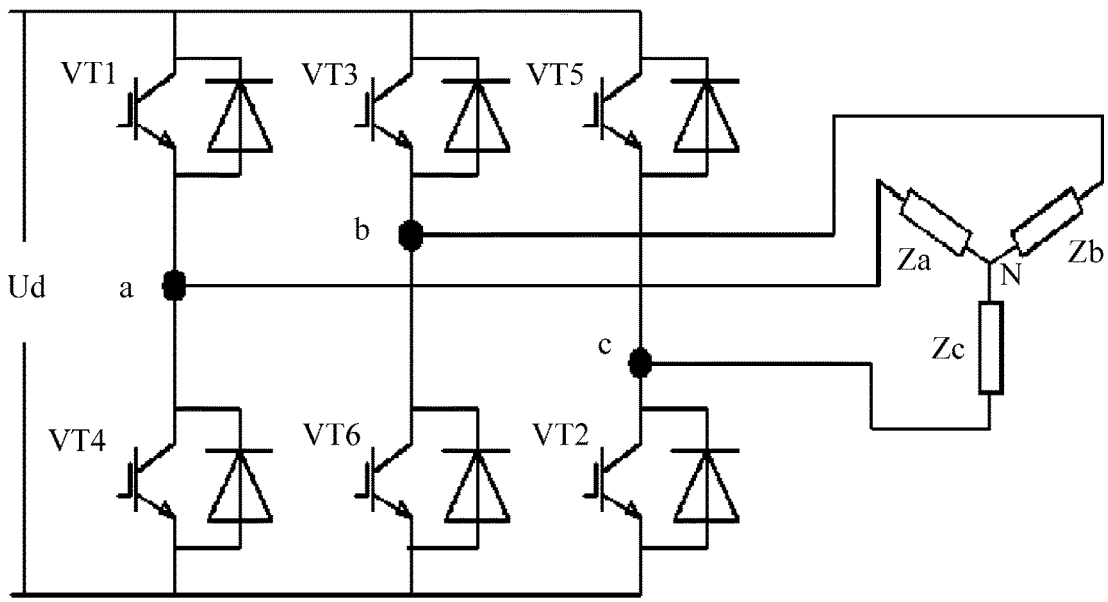
FIG. 15 is a schematic circuit diagram of a motor driving system according to an embodiment of the disclosure.

In an example, as shown in FIG. 15, the two-level three-phase inverter circuit is formed by six switch tubes, where all the six switch tubes may be insulated gate bipolar transistors (IGBTs). Specifically, when the drive motor is controlled to output the electric braking torque, a motor controller may control on/off of the six IGBTs, to generate and supply, to the drive motor, the three-phase alternating current voltage with the variable frequency and amplitude, and perform rotational speed closed-loop control on the drive motor by using the braking torque, until the rotational speed of the drive motor is reduced to zero, that is, the vehicle speed is reduced to zero.

In an example of the disclosure, referring to FIG. 15, Za, Zb, and Zc may be equivalent to star-connected three-phase stator windings of the drive motor, and the six switch tubes are respectively denoted as a first switch tube VT1, a second switch tube VT2, a third switch tube VT3, a fourth switch tube VT4, a fifth switch tube VT5, and a sixth switch tube VT6. The first switch tube VT1 and the fourth switch tube VT4 are connected in series to form an A-phase bridge arm, the third switch tube VT3 and the sixth switch tube VT6 are connected in series to form a B-phase bridge arm, and the fifth switch tube VT5 and the second switch tube VT2 are connected in series to form a C-phase bridge arm. The first switch tube VT1, the third switch tube VT3, and the fifth switch tube VT5 form an upper bridge arm, and the fourth switch tube VT4, the sixth switch tube VT6, and the second switch tube VT2 form a lower bridge arm. The adjusting the power supply voltage of the drive motor includes the following control sequentially repeated:

Control the first switch tube VT1, the second switch tube VT2, and the third switch tube VT3 to be on, and control the fourth switch tube VT4, the fifth switch tube VT5, and the sixth switch tube VT6 to be off; control the first switch tube VT1, the fifth switch tube VT5, and the sixth switch tube VT6 to be on, and control the second switch tube VT2, the third switch tube VT3, and the fourth switch tube VT4 to be off; control the third switch tube VT3, the fourth switch tube VT4, and the fifth switch tube VT5 to be on, and control the first switch tube VT1, the second switch tube VT2, and the sixth switch tube VT6 to be off; control the first switch tube VT1, the second switch tube VT2, and the sixth switch tube VT6 to be on, and control the third switch tube VT3, the fourth switch tube VT4, and the fifth switch tube VT5 to be off; control the second switch tube VT2, the third switch tube VT3, and the fourth switch tube VT4 to be on, and control the first switch tube VT1, the fifth switch tube VT5, and the sixth switch tube VT6 to be off; and control the fourth switch tube VT4, the fifth switch tube VT5, and the sixth switch tube VT6 to be on, and control the first switch tube VT1, the second switch tube VT2, and the third switch tube VT3 to be off.

That is, the motor controller may perform cyclical control shown in Table 1 on the six switch tubes (IGBTs) VT1 to VT6.

TABLE 1

| VT1 | VT2 | VT3 | VT4 | VT5 | VT6 |
| --- | --- | --- | --- | --- | --- |
| On  | On  | On  | Off | Off | Off |
| On  | Off | Off | Off | On  | On  |
| Off | Off | On  | On  | On  | Off |
| On  | On  | Off | Off | Off | On  |
| Off | On  | On  | On  | Off | Off |
| Off | Off | Off | On  | On  | On  |

Specifically, the two-level three-phase inverter circuit may be controlled to periodically execute the control in Table 1, and supply the generated voltage to the drive motor, thereby forming the constant magnetic field in the stator of the drive motor. The constant magnetic field interacts with the magnetic field formed by the permanent magnets of the rotor, thereby forcing the rotational speed of the rotor to gradually decrease. When the rotational speed of the rotor is reduced to zero, the rotor no longer cuts the magnetic field, so that the drive motor is stalled.

In an example, after the drive motor is locked, the vehicle is controlled to apply the mechanical braking torque.

In some embodiments, after the current vehicle speed is reduced to zero and the drive motor is locked, to prevent the vehicle from slipping forward or backward, referring to FIG. 4(*a*), a driver may apply a mechanical brake (a parking brake) to the vehicle by pulling a handbrake, to park the vehicle for a long time. The mechanical brake may be a hydraulic brake or an electrical park brake (EPB). In this case, the mechanical brake is only a parking function, and does not cause the wear of the brake disc and a brake pad.

Figure 16:
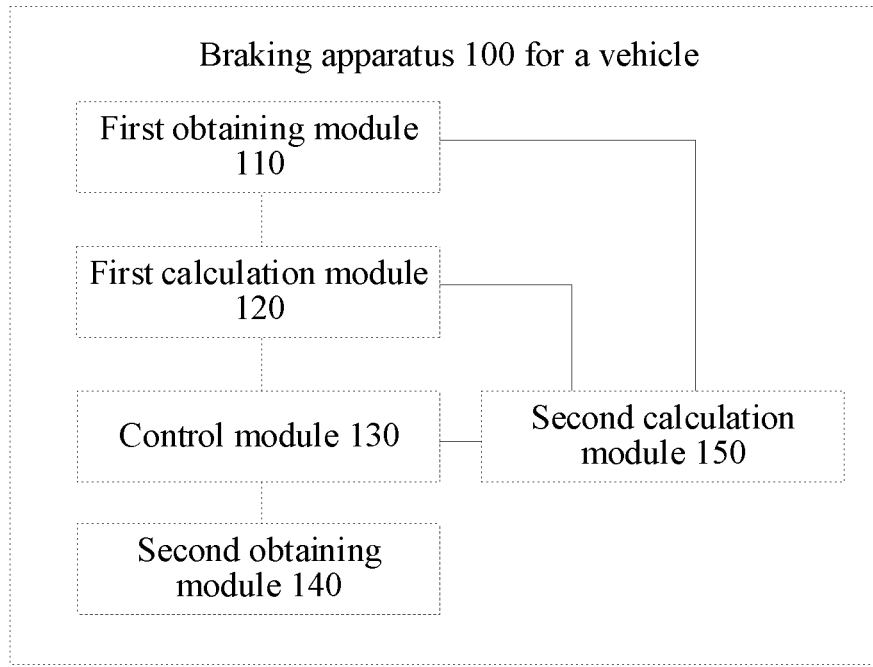
FIG. 16 is a structural block diagram of a braking device for a vehicle according to an embodiment of the disclosure.

FIG. 16 is a structural block diagram of a braking device for a vehicle according to an embodiment of the disclosure.

As shown in FIG. 16, a braking device 100 for a vehicle includes: a first obtaining module 110, a first calculation module 120, a control module 130, a second obtaining module 140, and a second calculation module 150.

The first obtaining module 110 is configured to obtain a first state information of the vehicle, where the first state information includes a vehicle mass and a deceleration required by braking. The first calculation module 120 is configured to calculate a braking torque required by the vehicle according to the first state information. The control module 130 is configured to control the vehicle to output an electric braking torque according to the braking torque required by the vehicle. The second obtaining module 140 is configured to obtain a current vehicle speed of the vehicle and a mechanical braking application delay time. The second calculation module 150 is configured to calculate an electric braking exit speed according to the braking torque required by the vehicle and the deceleration required by braking; and calculate a mechanical braking application speed according to the mechanical braking application delay time, the deceleration required by braking, and the electric braking exit speed, where the control module 130 is further configured to determine whether to control the vehicle to unload the electric braking torque, and whether to control the vehicle to apply a mechanical braking torque according to the current vehicle speed, the electric braking exit speed, and the mechanical braking application speed.

In an example, the second obtaining module 140 is further configured to obtain an unloading rate of the electric braking torque and a current ground adhesion coefficient; and when calculating the electric braking exit speed according to the braking torque required by the vehicle and the deceleration required by braking, the second calculation module 150 is specifically configured to calculate the electric braking exit speed according to the braking torque required by the vehicle, the unloading rate of the electric braking torque, the deceleration required by braking, and the current ground adhesion coefficient.

In an example, when calculating the electric braking exit speed according to the braking torque required by the vehicle, the unloading rate of the electric braking torque, the deceleration required by braking, and the current ground adhesion coefficient, the second calculation module 150 is specifically configured to: calculate an unloading time of the electric braking torque according to the braking torque required by the vehicle and the unloading rate of the electric braking torque; calculate a ground deceleration according to the current ground adhesion coefficient; and calculate the electric braking exit speed according to the unloading time of the electric braking torque, the deceleration required by braking, and the ground deceleration.

It should be noted that, the above description of the specific implementation of the braking method for a vehicle is also applicable to the braking device for a vehicle of this embodiment of the disclosure. To reduce redundancy, details are not described herein again.

The braking device for a vehicle of this embodiment of the disclosure can improve the precision of vehicle braking control, and improve riding experience for passengers.

Figure 17:
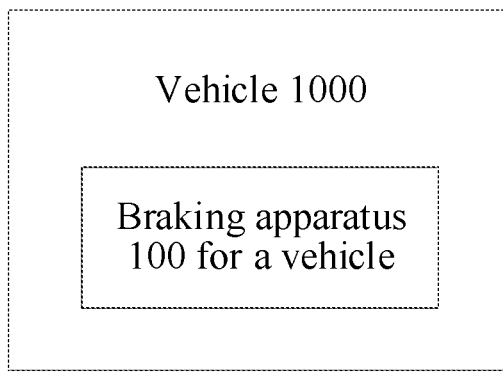
FIG. 17 is a structural block diagram of a vehicle according to an embodiment of the disclosure.

The disclosure further provides a vehicle. As shown in FIG. 17, a vehicle 1000 includes the braking device 100 for a vehicle of the foregoing embodiment.

Through the above braking device for a vehicle, the vehicle in the embodiments of the disclosure can improve the precision of vehicle braking control, and improve riding experience for passengers.

It should be noted that, the logic and/or steps shown in the flowcharts or described in any other manner herein, for example, a sequenced list that may be considered as executable instructions used for implementing logical functions, may be specifically implemented in any computer-readable medium to be used by an instruction execution system, device, or device (for example, a computer-based system, a system including a processor, or another system that can obtain an instruction from the instruction execution system, device, or device and execute the instruction) or to be used by combining such instruction execution systems, devices or devices. In the specification of this application, the "computer-readable medium" may be any device that can include, store, communicate, propagate, or transmit programs to be used by the instruction execution system, device or device or to be used in combination with the instruction execution system, device or equipment. More specific examples (a non-exhaustive list) of the computer-readable medium include the following: an electrical connection (electronic device) having one or more wires, a portable computer diskette (magnetic device), a random access memory (RAM), a read-only memory (ROM), an erasable programmable read-only memory (EPROM or flash memory), an optical fiber device, and a portable compact disk read-only memory (CDROM). In addition, the computer-readable medium can even be paper or other suitable media on which the program can be printed, because the program can be obtained electronically by, for example, optically scanning paper or other media, then editing, interpreting, or processing in other suitable ways if necessary, and then storing it in a computer memory.

It should be understood that, parts of the disclosure can be implemented by using hardware, software, firmware, or a combination thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application-specific integrated circuit having a suitable combined logic gate circuit, a programmable gate array (PGA), and a field programmable gate array (FPGA).

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the disclosure. In this specification, schematic descriptions of the foregoing terms do not necessarily point at a same embodiment or example. In addition, the described specific features, structures, materials, or characteristics may be combined in a proper manner in any one or more of the embodiments or examples.

In the description of the disclosure, it should be understood that the orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial ", "circumferential", etc. are the orientations or positional relationships shown in the drawings, are merely to facilitate describing the disclosure and to simplify the description, are not intended to indicate or imply that the referenced device or element needs to have a particular orientation, be constructed and operated in a particular orientation, and therefore are not to be construed as limiting the disclosure.

In addition, the terms "first" and "second" are used for descriptive purposes only and are not to be construed as indicating or implying relative importance or implicitly indicating the number of technical features indicated. Therefore, features defining "first" and "second" can explicitly or implicitly include at least one of the features. In the descriptions of the disclosure, unless explicitly specified, "multiple" means at least two, for example, two or three.

In the disclosure, it should be noted that unless otherwise explicitly specified and limited, the terms "mount", "connect", "connection", and "fix" should be understood in a broad sense. For example, a connection may be a fixed connection, a detachable connection, or an integral connection; or the connection may be a mechanical connection or an electrical connection; or the connection may be a direct connection, an indirect connection through an intermediary, or internal communication between two elements or mutual action relationship between two elements, unless otherwise specified explicitly. Unless otherwise explicitly specified or define, a person of ordinary skill in the art can understand specific meanings of the terms in the disclosure based on specific situations.

In the disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

While the embodiments of the disclosure have been shown and described above, it should be understood that the above-described embodiments are illustrative and not to be construed as limiting the disclosure, and changes, modifications, substitutions, and variations of the above-described embodiments may occur to those of ordinary skill in the art within the scope of the disclosure.

What is claimed is:

1. A braking method for a vehicle, comprising the following steps:
    obtaining a first state information of the vehicle, wherein the first state information comprises a vehicle mass and a deceleration required by braking;
    calculating a braking torque required by the vehicle according to the first state information, and controlling the vehicle to output an electric braking torque according to the braking torque required by the vehicle;
    obtaining a current vehicle speed of the vehicle, and a mechanical braking application delay time;
    calculating an electric braking exit speed according to the braking torque required by the vehicle and the deceleration required by braking;
    calculating a mechanical braking application speed according to the mechanical braking application delay time, the deceleration required by braking, and the electric braking exit speed; and
    determining whether to control the vehicle to unload the electric braking torque, and whether to control the vehicle to apply a mechanical braking torque according to the current vehicle speed, the electric braking exit speed, and the mechanical braking application speed.

2. The braking method for a vehicle according to claim 1, wherein the calculating an electric braking exit speed according to the braking torque required by the vehicle and the deceleration required by braking comprises:
    obtaining an unloading rate of the electric braking torque and a current ground adhesion coefficient; and
    calculating the electric braking exit speed according to the braking torque required by the vehicle, the unloading rate of the electric braking torque, the deceleration required by braking, and the current ground adhesion coefficient.

3. The braking method for a vehicle according to claim 2, wherein the calculating the electric braking exit speed according to the braking torque required by the vehicle, the unloading rate of the electric braking torque, the deceleration required by braking, and the current ground adhesion coefficient comprises:
    calculating an unloading time of the electric braking torque according to the braking torque required by the vehicle and the unloading rate of the electric braking torque;
    calculating a ground deceleration according to the current ground adhesion coefficient; and
    calculating the electric braking exit speed according to the unloading time of the electric braking torque, the deceleration required by braking, and the ground deceleration.

4. The braking method for a vehicle according to claim 3, wherein the calculating a mechanical braking application speed according to the mechanical braking application delay time, the deceleration required by braking, and the electric braking exit speed comprises:
    calculating a speed difference according to the mechanical braking application delay time and the deceleration required by braking; and
    calculating the mechanical braking application speed according to the speed difference and the electric braking exit speed.

5. The braking method for a vehicle according to claim 4, wherein the determining whether to control the vehicle to unload the electric braking torque, and whether to control the vehicle to apply a mechanical braking torque according to the current vehicle speed, the electric braking exit speed, and the mechanical braking application speed comprises:
    controlling the vehicle to unload the electric braking torque when the current vehicle speed is less than the electric braking exit speed, and controlling the vehicle to apply the mechanical braking torque when the current vehicle speed is less than the mechanical braking application speed.

6. The braking method for a vehicle according to claim 5, further comprising:
    obtaining a current gradient of the vehicle; and
        determining whether to control the vehicle to unload the electric braking torque, and whether to control the vehicle to apply the mechanical braking torque according to the current vehicle speed, the braking torque required by the vehicle, the deceleration required by braking, and the current gradient.

7. The braking method for a vehicle according to claim 6, wherein the determining whether to control the vehicle to unload the electric braking torque, and whether to control the vehicle to apply the mechanical braking torque according to the current vehicle speed, the braking torque required by the vehicle, the deceleration required by braking, and the current gradient comprises:
    the current gradient is not zero, calculating the mechanical braking application speed according to the braking torque required by the vehicle, the deceleration required by braking, and the current gradient, and controlling the vehicle to apply the mechanical braking torque when the current vehicle speed is less than the mechanical braking application speed.

8. The braking method for a vehicle according to claim 1, wherein the calculating a mechanical braking application speed according to the mechanical braking application delay time, the deceleration required by braking, and the electric braking exit speed comprises:
 calculating a speed difference according to the mechanical braking application delay time and the deceleration required by braking; and
 calculating the mechanical braking application speed according to the speed difference and the electric braking exit speed.

9. The braking method for a vehicle according to claim 1, wherein the determining whether to control the vehicle to unload the electric braking torque, and whether to control the vehicle to apply a mechanical braking torque according to the current vehicle speed, the electric braking exit speed, and the mechanical braking application speed comprises:
 controlling the vehicle to unload the electric braking torque when the current vehicle speed is less than the electric braking exit speed, and controlling the vehicle to apply the mechanical braking torque when the current vehicle speed is less than the mechanical braking application speed.

10. The braking method for a vehicle according to claim 1, further comprising:
 obtaining a current gradient of the vehicle; and
 determining whether to control the vehicle to unload the electric braking torque, and whether to control the vehicle to apply the mechanical braking torque according to the current vehicle speed, the braking torque required by the vehicle, the deceleration required by braking, and the current gradient.

11. The braking method for a vehicle according to claim 10, wherein the determining whether to control the vehicle to unload the electric braking torque, and whether to control the vehicle to apply the mechanical braking torque according to the current vehicle speed, the braking torque required by the vehicle, the deceleration required by braking, and the current gradient comprises:
 if the current gradient is not zero, calculating the mechanical braking application speed according to the braking torque required by the vehicle, the deceleration required by braking, and the current gradient, and controlling the vehicle to apply the mechanical braking torque when the current vehicle speed is less than the mechanical braking application speed.

12. The braking method for a vehicle according to claim 11, wherein the controlling the vehicle to apply the mechanical braking torque comprises:
 obtaining an unloading rate of the electric braking torque, and controlling the vehicle to apply the mechanical braking torque according to the unloading rate of the electric braking torque; or obtaining a current electric braking torque, and controlling the vehicle to apply the mechanical braking torque according to the braking torque required by the vehicle and the current electric braking torque.

13. The braking method for a vehicle according to claim 12, wherein the mechanical braking torque is provided by a hydraulic brake system, and the controlling the vehicle to apply the mechanical braking torque comprises:
 obtaining a second state information of the vehicle, wherein the second state information comprises a kinetic friction coefficient, a brake disc radius, and a clamp port area; and
 controlling the hydraulic brake system to apply the mechanical braking torque according to the unloading rate of the electric braking torque, the first state information, and the second state information; or controlling the hydraulic brake system to apply the mechanical braking torque according to the braking torque required by the vehicle, the current electric braking torque, the first state information, and the second state information.

14. The braking method for a vehicle according to claim 10, wherein the determining whether to control the vehicle to unload the electric braking torque, and whether to control the vehicle to apply the mechanical braking torque according to the current vehicle speed, the braking torque required by the vehicle, the deceleration required by braking, and the current gradient further comprises:
 if the current gradient is zero, controlling the vehicle to apply the mechanical braking torque when the current vehicle speed of the vehicle is zero.

15. The braking method for a vehicle according to claim 10, wherein the determining whether to control the vehicle to unload the electric braking torque, and whether to control the vehicle to apply the mechanical braking torque according to the current vehicle speed, the braking torque required by the vehicle, the deceleration required by braking, and the current gradient comprises:
 if the current gradient is not zero, controlling a sum of the electric braking torque and the mechanical braking torque to be equal to the braking torque required by the vehicle.

16. A braking device for a vehicle, comprising:
 a first obtaining module, configured to obtain a first state information of the vehicle, wherein the first state information comprises a vehicle mass and a deceleration required by braking;
 a first calculation module, configured to calculate a braking torque required by the vehicle according to the first state information;
 a control module, configured to control the vehicle to output an electric braking torque according to the braking torque required by the vehicle;
 a second obtaining module, configured to obtain a current vehicle speed of the vehicle and a mechanical braking application delay time; and
 a second calculation module, configured to calculate an electric braking exit speed according to the braking torque required by the vehicle and the deceleration required by braking; and calculate a mechanical braking application speed according to the mechanical braking application delay time, the deceleration required by braking, and the electric braking exit speed;
 wherein the control module is further configured to determine whether to control the vehicle to unload the electric braking torque, and whether to control the vehicle to apply a mechanical braking torque according to the current vehicle speed, the electric braking exit speed, and the mechanical braking application speed.

17. A vehicle, comprising the braking device for a vehicle according to claim 16.

18. The braking device for a vehicle according to claim 16, wherein the control module is further configured to, when a current gradient of the vehicle is not zero, calculate the mechanical braking application speed according to the braking torque required by the vehicle, the deceleration required by braking, and the current gradient and control the vehicle to apply the mechanical braking torque when the current vehicle speed is less than the mechanical braking application speed.

19. The braking device for a vehicle according to claim 16, wherein the control module is further configured to, when a current gradient of the vehicle is zero, control the vehicle to apply the mechanical braking torque when the current vehicle speed of the vehicle is zero.

20. The braking device for a vehicle according to claim 16, wherein the control module is further configured to, when a current gradient of the vehicle is not zero, control a sum of the electric braking torque and the mechanical braking torque to be equal to the braking torque required by the vehicle.

* * * * *